(12) United States Patent
Takahashi et al.

(10) Patent No.: US 7,263,884 B2
(45) Date of Patent: Sep. 4, 2007

(54) VIBRATION TYPE GYROSENSOR DEVICE

(75) Inventors: Kazuo Takahashi, Miyagi (JP); Takashi Tamura, Miyagi (JP); Junichi Honda, Miyagi (JP); Teruo Inaguma, Miyagi (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 11/088,480

(22) Filed: Mar. 24, 2005

(65) Prior Publication Data

US 2005/0241395 A1 Nov. 3, 2005

(30) Foreign Application Priority Data

Mar. 31, 2004 (JP) .......................... P2004-105885

(51) Int. Cl.
*G01P 3/02* (2006.01)
*G01P 9/00* (2006.01)
*H01L 41/08* (2006.01)

(52) U.S. Cl. .............................. 73/504.15; 73/504.12; 310/329

(58) Field of Classification Search ............ 73/504.12, 73/504.15, 504.13, 504.14, 504.16, 514.34, 73/514.36; 310/321, 367, 329, 370
See application file for complete search history.

(56) References Cited

U.S. PATENT DOCUMENTS

| 4,443,729 A | * | 4/1984 | Rider .......................... 310/330 |
| 5,321,685 A | * | 6/1994 | Nose et al. ................. 369/126 |
| 5,794,080 A | * | 8/1998 | Watanabe et al. ............. 396/53 |
| 5,796,000 A | * | 8/1998 | Fujiu et al. ............... 73/504.15 |

* cited by examiner

*Primary Examiner*—Helen Kwok
(74) *Attorney, Agent, or Firm*—Sonnenschein Nath & Rosenthal LLP

(57) ABSTRACT

Disclosed is a small-sized vibration type gyrosensor device of high sensitivity provided with a cantilevered oscillator. A cantilevered oscillator 11, provided with a lower electrode, a piezoelectric film and an upper electrode, formed on a single-crystal silicon substrate by a thin film forming process, includes, as an upper electrode, a driving electrode 6a, formed along the length of the oscillator 11 for applying the voltage for causing oscillations of the oscillator 11, and first and second detection electrodes 6b, 6c, formed on both sides of the driving electrode 6a parallel to the longitudinal direction of the oscillator, without contacting with the driving electrode 6a. With a width W0 of the driving electrode 6a, a width W1 of the first detection electrode 6b, a width W2 of the second detection electrode 6c and with W=W0+W1+W2, the condition of 0.5<(W0/W)<1 is to be met.

38 Claims, 26 Drawing Sheets

Width of driving electrode
(relative value referred to effective piezoelectric film)
W0/W(W=W0+W1+W2)

Length of detection electrode
(relative value referred to length of detection electrode)
L2/L1

Position of detection electrode
(relative Position referred to width of oscillator)
P1/S, P2/S

VIBRATION TYPE GYROSENSOR DEVICE

BACKGROUND OF THE INVENTION

1. Field of the Invention

This invention relates to an acceleration sensor used e.g. for detecting hand shake of a video camera, for detecting the movement in a virtual reality apparatus or for detecting the direction in a car navigation system and, more particularly, to a small-sized vibration type gyrosensor device having a cantilevered oscillator.

This application claims priority of Japanese Patent Application No. 2004-105885, filed on Mar. 31, 2004, the entirety of which is incorporated by reference herein.

2. Description of Related Art

As an acceleration sensor for household use, a so-called vibration type acceleration sensor in which a cantileverd oscillator is kept in a state of being oscillated at a preset resonance frequency, and in which the Corioris force produced under the effect of angular velocity is detected by e.g. a piezoelectric element, is in widespread use.

The vibration type acceleration sensor has various merits, such as a simple mechanism, short startup time, and low manufacturing costs, and is loaded e.g. on a video camera, a virtual reality device or a car navigation system, for use as a sensor for detecting the handshake, movement detection or direction detection.

The vibration type acceleration sensor is required to be of a small size and a high performance, in order to keep pace with the tendency towards a small size and a high performance of the electronic equipment on which to mount the gyrosensor. For example, with the tendency to providing the electronic equipment with multiple functions, there is raised a demand to loading the vibration type acceleration sensor, along with a variety of sensors used for other purposes, on a sole substrate, in order to reduce the overall size.

The vibration type gyrosensor suffers a problem that, since the piezoelectric material is sliced by mechanical machining, followed by shaping, in order to produce the oscillator, there is a limit imposed on the machining accuracy in reducing the size of the gyrosensor, with the result that the desired performance cannot be achieved.

Thus, a piezoelectric vibrational angular velocity meter, in which an oscillator is prepared by forming a thin film of a piezoelectric material on a single crystal silicon substrate for reducing the size, that is, a vibration type gyrosensor, has been devised (see for example Patent Publications 1 and 2). Such vibration type gyrosensor has also been devised which employs a cantilevered oscillator formed by a silicon machining process, and in which a driving electrode is mounted along the longitudinal direction of the oscillator, whilst a pair of detection electrodes are formed for sandwiching the driving electrode without contacting with the driving electrode (see for example Patent Publication 3).

Of these vibration type gyrosensors, it is required to detect the angular velocity with higher sensitivity.

[Patent Publication 1] Japanese Laid-open Patent Publication H8-261763

[Patent Publication 2] Japanese Laid-open Patent Publication H8-327364

[Patent Publication 3] Japanese Laid-open Patent Publication H7-113643

SUMMARY OF THE INVENTION

In view of the above depicted status of the art, it is an object of the present invention to provide a vibration type gyrosensor, in which the sensitivity of the sensor is improved by prescribing the width and the length of the driving electrode and the location of the detection electrode on the oscillator.

In one aspect, the present invention provides a vibration type gyrosensor device including a cantilevered oscillator having a lower electrode, a piezoelectric film and an upper electrode formed by a thin film forming process on a single-crystal silicon substrate, for detecting the angular velocity by exploiting the piezoelectric effect of the piezoelectric film. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a distance L1 from the root of the oscillator to the center-of-gravity position of the driving electrode, a distance L2 from the root of the oscillator to the center-of-gravity position of the first detection electrode and with a distance L2 from the root of the oscillator to the center-of-gravity position of the second detection electrode, the condition of $0 < (L2/L1) \leq 0.75$ is met.

In another aspect, the present invention provides a vibration type gyrosensor device including a cantilevered oscillator having a lower electrode, a piezoelectric film, and an upper electrode, and configured for detecting the angular velocity by exploiting the piezoelectric effect of the piezoelectric film. A first protective film pattern includes a first opening in one major surface of a single-crystal silicon substrate having surface orientation {100} of the one major surface and surface orientation {100} of an opposite side major surface. The first opening is formed by straight lines parallel or perpendicular to a {110} plane, and is subjected to crystal anisotropic etching until the thickness of the oscillator is reached. The lower electrode, piezoelectric film and the upper electrode are sequentially deposited in an area of the other major surface, on the opposite side of the one major surface, subjected to crystal anisotropic etching to give a thickness of the oscillator, the area being an area for the oscillator. A second protective film pattern, having a second opening, is formed on the opposite side major surface, carrying the lower electrode, piezoelectric film and the upper electrode. The second opening is formed by straight lines parallel or perpendicular to the {110} plane, and is profiled to form a gap to provide the cantilevered shape of the oscillator. The second opening is subjected to reactive ion etching (RIE) to form the oscillator. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a distance L1 from the root of the oscillator to the center-of-gravity position of the driving electrode, a distance L2 from the root of the oscillator to the center-of-gravity position of the first detection electrode, and with a distance L2 from the root of the oscillator to the center-of-gravity position of the second detection electrode, the condition of $0 < (L2/L1) \leq 0.75$ is met. The symbol { } is used as a collective appellation for a surface orientation different in directions.

In a further aspect, the present invention provides a vibration type gyrosensor device including a cantilevered oscillator having a lower electrode, a piezoelectric film and an upper electrode, and configured for detecting the angular velocity by exploiting the piezoelectric effect of the piezoelectric film. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With the shortest distance P1 from the sidewall surface of the oscillator, provided with the first detection electrode, to the width-wise center position of the first detection electrode, the shortest distance P2 from the sidewall surface of the oscillator, provided with the second detection electrode, to the width-wise center position of the second detection electrode, and with a width S of the oscillator, the conditions of $0<(P1/S)<0.125$ and $0<(P2/S)<0.125$ are met.

In a further aspect, the present invention provides a vibration type gyrosensor device including a cantilevered oscillator having a lower electrode, a piezoelectric film and an upper electrode, and configured for detecting the angular velocity by exploiting the piezoelectric effect of the piezoelectric film. A first protective film pattern includes a first opening in one major surface of a single-crystal silicon substrate having surface orientation {100} of the one major surface and surface orientation {100} of an opposite side major surface. The first opening is formed by straight lines parallel or perpendicular to a {110} plane, and is subjected to crystal anisotropic etching until the thickness of the oscillator is reached. The lower electrode, piezoelectric film and the upper electrode are sequentially deposited in an area of the other major surface, on the opposite side of the one major surface, subjected to crystal anisotropic etching to give a thickness of the oscillator, the area being an area for the oscillator. A second protective film pattern has a second opening, on the opposite side major surface, carrying the lower electrode, piezoelectric film and the upper electrode. The second opening is formed by straight lines parallel or perpendicular to the {110} plane, and is profiled to form a gap to provide the cantilevered shape of the oscillator. The second opening is subjected to reactive ion etching (RIE) to form the oscillator. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With the shortest distance P1 from the sidewall surface of the oscillator, provided with the first detection electrode, to the width-wise center position of the first detection electrode, the shortest distance P2 from the sidewall surface of the oscillator, provided with the second detection electrode, to the width-wise center position of the second detection electrode, and with a width S of the oscillator, the conditions of $0<(P1/S)<0.125$ and $0<(P2/S)<0.125$ are met. The symbol { } is used as a collective appellation for a surface orientation different in directions.

In a further aspect, the present invention provides a vibration type gyrosensor device including a cantilevered oscillator having a lower electrode, a piezoelectric film and an upper electrode formed by a thin film forming process on a single-crystal silicon substrate, for detecting the angular velocity by exploiting the piezoelectric effect of the piezoelectric film. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a width W0 of the driving electrode, a width W1 of the first detection electrode, a width W2 of the second detection electrode, and with $W=W0+W1+W2$, the condition of $0.5<(W0/W)<1$ is met.

In a further aspect, the present invention provides a vibration type gyrosensor device including a cantilevered oscillator having a lower electrode, a piezoelectric film and an upper electrode, and configured for detecting the angular velocity by exploiting the piezoelectric effect of the piezoelectric film. A first protective film pattern includes a first opening in one major surface of a single-crystal silicon substrate having surface orientation {100} of the one major surface and surface orientation {100} of an opposite side major surface. The first opening is formed by straight lines parallel or perpendicular to a {110} plane, and is subjected to crystal anisotropic etching until the thickness of the oscillator is reached. The lower electrode, piezoelectric film and the upper electrode are sequentially deposited in an area of the other major surface, on the opposite side of the one major surface, subjected to crystal anisotropic etching to give a thickness of the oscillator, the area being an area for the oscillator. A second protective film pattern has a second opening, on the opposite side major surface, carrying the lower electrode, piezoelectric film and the upper electrode, and is formed by straight lines parallel or perpendicular to the {110} plane. The second opening is profiled to form a gap to provide the cantilevered shape of the oscillator, and is subjected to reactive ion etching (RIE) to form the oscillator. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a width W0 of the driving electrode, a width W1 of the first detection electrode, a width W2 of the second detection electrode, and with $W=W0+W1+W2$, the condition of $0.5<(W0/W)<1$ is met. The symbol { } is used as a collective appellation for a surface orientation different in directions.

In a further aspect, the present invention provides a vibration type gyrosensor device including a cantilevered oscillator having a lower electrode, a piezoelectric film and an upper electrode formed by a thin film forming process on a single-crystal silicon substrate, for detecting the angular velocity by exploiting the piezoelectric effect of the piezoelectric film. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a width W0 of the driving electrode, a width W1 of the first detection electrode, a width W2 of the second detection electrode, with $W=W0+W1+W2$, with a distance L1 from the root of the oscillator to the center-of-gravity position of the driving electrode, a distance L2 from the root of the oscillator to the center-of-gravity position of the first detection electrode, a distance L2 from the root of the oscillator to the center-of-gravity position of the second detection electrode, and the shortest distance P1 from the sidewall surface of the oscillator, provided with the first detection electrode, to the width-wise center position of the first detection electrode, the shortest distance P2 from the sidewall surface of the oscillator, provided with the second detection electrode, to the width-wise center position of the second detection electrode, and with a width S of the oscillator, the conditions of $0<(L2/L1)\leqq 0.75$, $0<(P1/S)<0.125$, $0<(P2/S)<0.125$ and $0.5<(W0/W)<1$ are met.

In yet another aspect, the present invention provides a vibration type gyrosensor device including a cantilevered oscillator having a lower electrode, a piezoelectric film and an upper electrode, and configured for detecting the angular velocity by exploiting the piezoelectric effect of the piezoelectric film. A first protective film pattern includes a first opening in one major surface of a single-crystal silicon substrate having surface orientation {100} of the one major surface and surface orientation {100} of an opposite side major surface. The first opening is formed by straight lines parallel or perpendicular to a {110} plane, and is subjected to crystal anisotropic etching until the thickness of the oscillator is reached. The lower electrode, piezoelectric film and the upper electrode are sequentially deposited in an area of the opposite side major surface, on the opposite side of the one major surface, subjected to crystal anisotropic etching to give a thickness of the oscillator, the area being an area for the oscillator. A second protective film pattern has a second opening, on the opposite side major surface, carrying the lower electrode, piezoelectric film and the upper electrode. The second opening is formed by straight lines parallel or perpendicular to the {110} plane, and is profiled to form a gap to provide the cantilevered shape of the oscillator. The second opening is subjected to reactive ion etching (RIE) to form the oscillator. The oscillator includes, as the upper electrode, a driving electrode, arranged along the length of the oscillator for applying the voltage for causing oscillations of the oscillator, and first and second detection electrodes, arranged on both sides of and parallel to the driving electrode, for extending along the length of the oscillator, without contacting with the driving electrode.

With a width W0 of the driving electrode, a width W1 of the first detection electrode, a width W2 of the second detection electrode, with W=W0+W1+W2, with a distance L1 from the root of the oscillator to the center-of-gravity position of the driving electrode, a distance L2 from the root of the oscillator to the center-of-gravity position of the first detection electrode, a distance L2 from the root of the oscillator to the center-of-gravity position of the second detection electrode, the shortest distance P1 from the sidewall surface of the oscillator, provided with the first detection electrode, to the width-wise center position of the first detection electrode, the shortest distance P2 from the sidewall surface of the oscillator, provided with the second detection electrode, to the width-wise center position of the second detection electrode, and with a width S of the oscillator, the conditions of $0<(L2/L1)\leqq 0.75$, $0<(P1/S)<0.125$, $0<(P2/S)<0.125$ and $0.5<(W0/W)<1$ are met.

According to the present invention, the conditions of $(1) 0<(L2/L1)\leqq 0.75$, $(2) 0<(P1/S)<0.125$, $(3) 0<(P2/S)<0.125$ and $(4) 0.5<(W0/W)<1$ are met either alone or in optional combination, where W0 is the width of the driving electrode, W1 is a width of the first detection electrode, W2 is a width of the second detection electrode, with W=W0+W1+W2, L1 is a distance L1 from the root of the oscillator to the center-of-gravity position of the driving electrode, L2 is a distance from the root of the oscillator to the center-of-gravity position of the first detection electrode and a distance from the root of the oscillator to the center-of-gravity position of the second detection electrode, P1 is the shortest distance from the sidewall surface of the oscillator, provided with the first detection electrode, to the width-wise center position of the first detection electrode, P2 is the shortest distance from the sidewall surface of the oscillator, provided with the second detection electrode, to the width-wise center position of the second detection electrode, ands is a width S of the oscillator.

Thus, by prescribing the width of the driving electrode, the length of the first and second detection electrodes and the position on the oscillator of the first and second detection electrodes, the amount of oscillations of the oscillator and the signal level of the detection signals may be increased, and hence the detection efficiency may be improved, with the consequence that the vibration type gyrosensor device may be improved appreciably in sensitivity.

DESCRIPTION OF THE PREFERRED EMBODIMENTS

Figure 1:
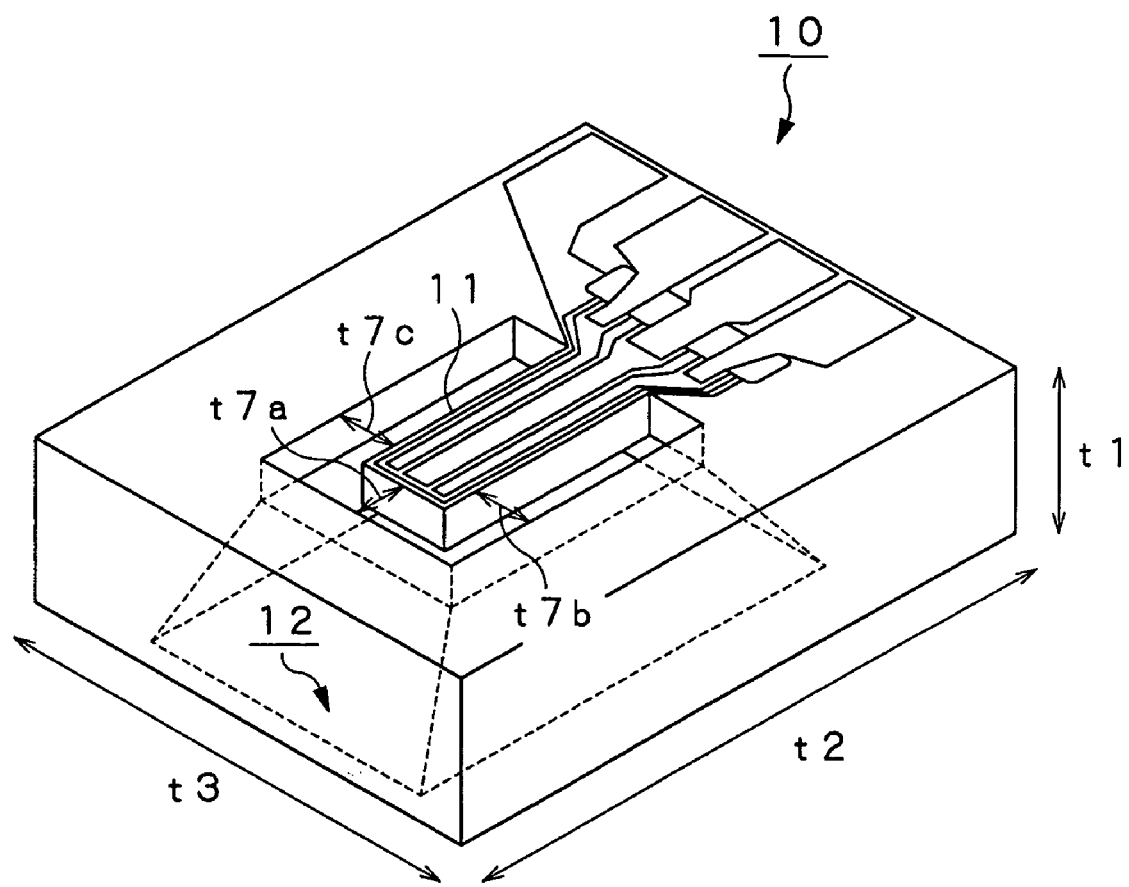
FIG. 1 is a perspective view for illustrating a vibration type gyrosensor device shown as a best embodiment for carrying out the present invention.

Referring to the drawings, preferred embodiments of a vibration type gyrosensor according to the present invention are explained in detail.

Figure 2:
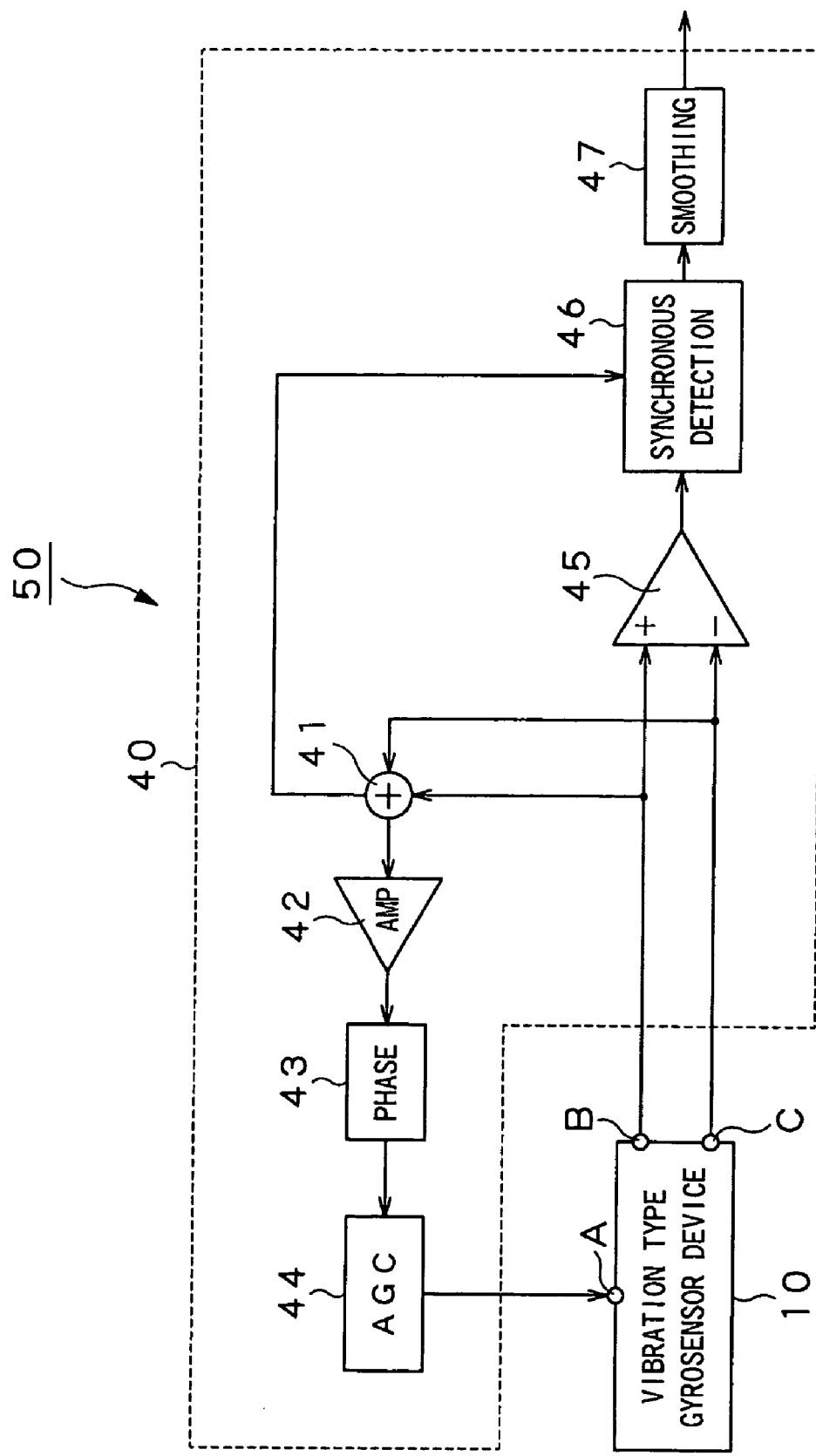
FIG. 2 illustrates the structure of an angular velocity sensor provided with the vibration type gyrosensor device.

FIG. 1 is a perspective view for illustrating a vibration type gyrosensor device 10 provided to an angular velocity sensor 50 embodying the present invention. FIG. 2 illustrates the structure of the angular velocity sensor. For illustration sake, the vibration type gyrosensor device 10, shown in FIG. 1, is partially shown in a see-through fashion.

Referring to FIG. 1, the vibration type gyrosensor device 10 is provided with a so-called cantilevered oscillator 11. The oscillator 11 is formed as a beam, secured at an end, by providing an ambient spacing 12 around the oscillator 11 in a device sliced out from a silicon single crystal substrate so as to have a thickness t1, a length t2 and a width t3. For the oscillator, there are reserved spatial widths t7$b$, t7$c$ in a direction perpendicular to the longitudinal direction and a spatial width t7$a$ along the longitudinal direction. The spatial widths t7$b$, t7$c$ are of equal magnitudes.

The oscillator 11 is formed to a quadrangular prismatic shape having a cross-section, taken along a plane perpendicular to the longitudinal direction, in the form of a regular quadrangle.

Figure 3:
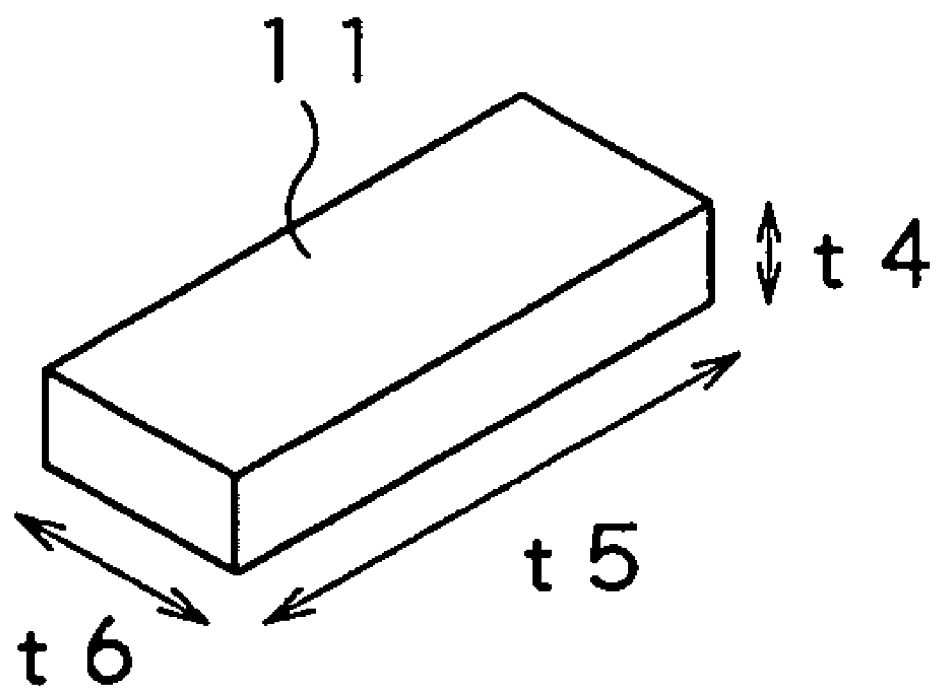
FIG. 3 is a perspective view for illustrating an oscillator provided to the vibration type gyrosensor device.

The vibration type gyrosensor device 10 may be sized such that, with a thickness t1, a length t2 and a width t3 of the device, as described above, t1=300 μm, t2=3 mm and t3=1 mm. For this case, the oscillator 11 may be sized such that, with a thickness t4, a length t5 and a width t6 of the oscillator 11, as shown in FIG. 3. t4=100 μm, t5=2.5 mm and t6=100 μm.

Figure 4:
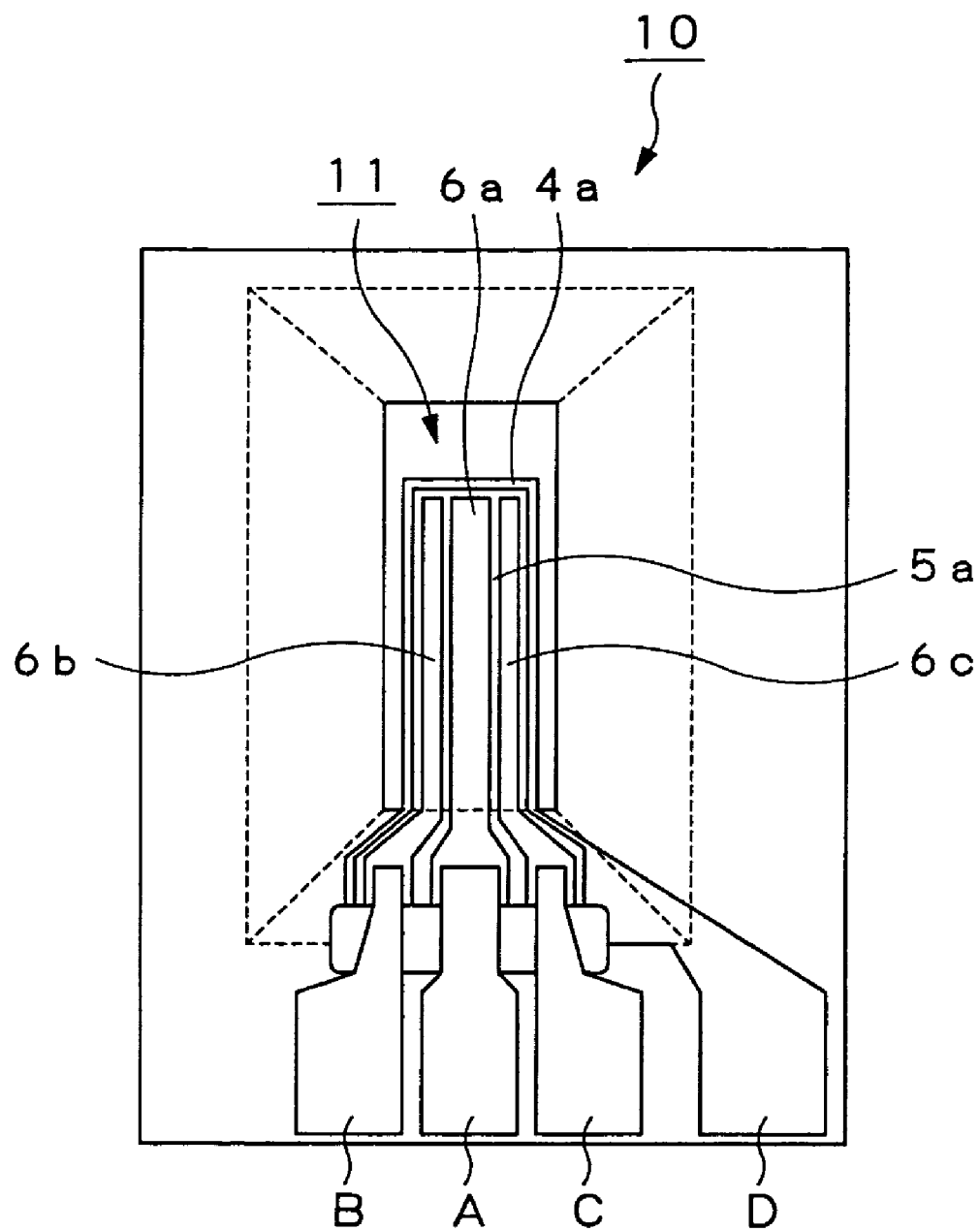
FIG. 4 is a plan view for illustrating the vibration type gyrosensor device.

FIG. 4 depicts a plan view of the vibration type gyrosensor device 10. Referring to FIG. 4, a reference electrode 4$a$ and a piezoelectric layer 5$a$ are layered in this order on the top of an oscillator 11. On the piezoelectric layer 5$a$ are arrayed a driving electrode 6$a$ and a pair of detection electrodes 6$b$, 6$c$ on both sides of the driving electrode 6$a$. These electrodes 6$a$ to 6$c$ are arrayed for extending parallel to one another along the longitudinal direction of the oscillator 11 in a manner free of contact with one another. The driving electrode 6$a$, detection electrodes 6$b$, 6$c$ and the reference electrode 4$a$ are provided with conductor interconnecting terminals A, B, C and D, respectively.

The piezoelectric layer 5$a$ is a thin film of piezo ceramics, such as lead zirconate titanate (PZT), or piezo single crystal, such as quartz or LaTaO$_3$.

The vibration type gyrosensor device 10 is in operation when connected to an IC circuit 40, shown in FIG. 2, and operates as an angular velocity sensor 50 for detecting the Corioris force generated responsive to the angular velocity.

The IC circuit 40 is made up by an addition circuit 41, an amplifier circuit 42, a phase shifting circuit 43, an AGC (automatic gain control circuit) 44, a differential amplifier circuit 45, a synchronous detection circuit 46 and a smoothing circuit 47.

The paired detection electrodes 6$b$, 6$c$ of the vibration type gyrosensor device 10 are connected via conductor interconnecting terminals B and C to the addition circuit 41 and to the differential amplifier circuit 45, respectively. The driving electrode 6$a$ of the vibration type gyrosensor device 10 is connected via conductor interconnecting terminal A to an output end of the AGC 44.

In the angular velocity sensor 50, a so-called phase shifting oscillation circuit is formed by the addition circuit 41, amplifier circuit 42, phase shifting circuit 43 and by the AGC 44. By this phase shifting oscillating circuit, a voltage is applied across the reference electrode 4$a$ and the driving electrode 6$a$ of the vibration type gyrosensor device 10 to cause self-excited vibrations of the oscillator 11. The direction of oscillations of the oscillator 11 is the direction of thickness of the oscillator 11.

In the angular velocity sensor 50, the paired detection electrodes 6$b$, 6$c$ are connected via conductor interconnecting terminals B and C to the addition circuit 41 and to the differential amplifier circuit 45. Outputs of the circuits 41, 45 are connected to the synchronous detection circuit 46, which synchronous detection circuit 46 is connected to the smoothing circuit 47. These components and the piezoelectric layer 5a make up a detection unit for detecting the angular velocity of the oscillator 11.

In the angular velocity sensor 50, shown in FIG. 2, the Corioris force, generated in a direction pertinent to the direction of oscillations, as a result of application of the angular velocity in the longitudinal direction of the oscillator 11, is detected by the piezoelectric layer 5a, when the oscillator 11 of the vibration type gyrosensor device 10 is subjected to the self-excited vibrations by the above-described phase-shifting oscillating circuit. The so generated Corioris force is output from the detection electrodes 6b, 6c as signals of relatively opposite polarities and entered to the differential amplifier circuit 45. An amplified output of the differential amplifier circuit 45 is entered to the synchronous detection circuit 46 to undergo synchronous detection. At this time, the synchronous detection circuit 46 is supplied with an output from the addition circuit 41 as a synchronizing signal for carrying out the synchronous detection. An output of the synchronous detection circuit 46 is output, via smoothing circuit 47, as an angular velocity signal, which is a DC signal obtained on detecting the Corioris force generated in the oscillator 11.

With the angular velocity sensor 50, described above, the piezoelectric layer 5a is used to cause the oscillations of the oscillator 11, while the Corioris force, generated in the oscillator 11, is detected by the piezoelectric layer 5a. The angular velocity may be detected on the basis of the Corioris force as detected by the piezoelectric layer 5a.

EMBODIMENTS

The method for producing the above-described vibration type gyrosensor device 10 is now explained as an embodiment of the present invention.

The vibration type gyrosensor device 10, shown in FIG. 1, is formed by machining a single crystal silicon substrate.

Figure 5:
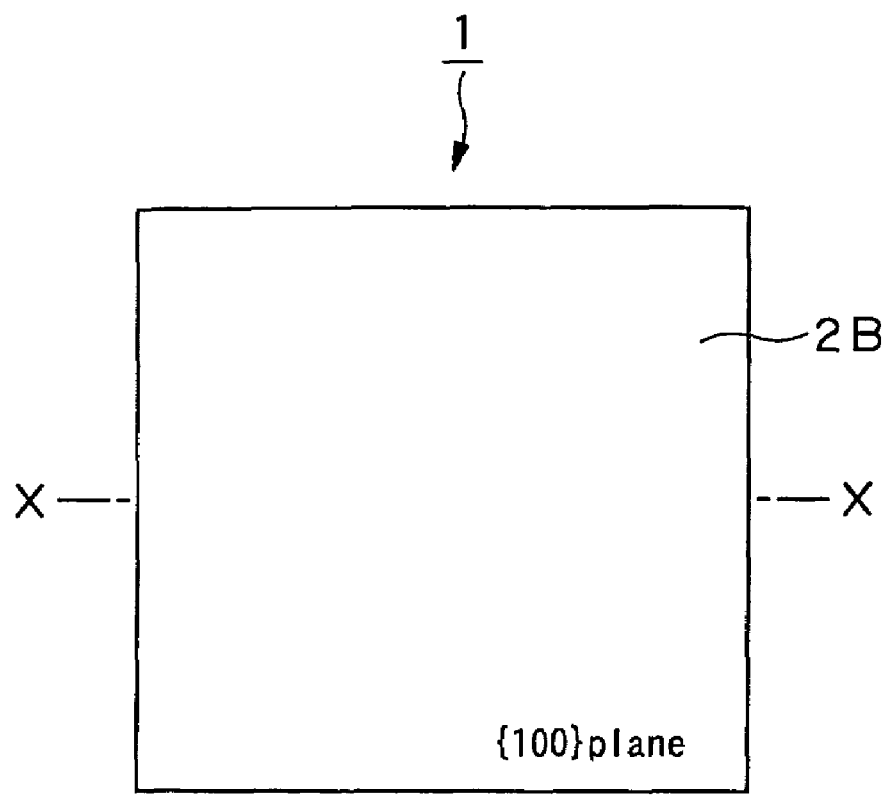
FIG. 5 is a plan view for illustrating a single crystal silicon substrate used in manufacturing the vibration type gyrosensor device.
Figure 6:
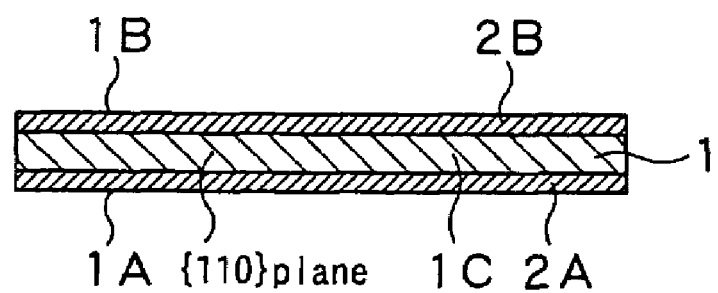
FIG. 6 is a cross-sectional view, taken along line X-X of FIG. 5, showing the single crystal silicon substrate.

FIG. 5 depicts a plan view of a single-crystal silicon substrate 1, used for forming the vibration type gyrosensor device 10. FIG. 6 depicts a cross-sectional view of the single-crystal silicon substrate 1, taken along line XX of FIG. 5. One 1B and the other 1A of the major surfaces of the single-crystal silicon substrate 1 are thermally oxidized to form a SiO$_2$ film operating as a protective film at the time of the crystal anisotropic etching which will be explained subsequently The single-crystal silicon substrate 1, used in the vibration type gyrosensor device 10, is sliced out so that the surface orientation of the major surface 1B of the single-crystal silicon substrate 1 is {100}, as shown in FIG. 5, and so that the surface orientation of a lateral surface IC is {110}, as shown in FIG. 6. Meanwhile, the other major surface 1A is parallel to the opposite side major surface 1B, and hence the surface orientation of the major surface 1A is similarly {100}.

It is noted that "{ }" is a symbol used for collective appellation of equivalent surface orientations having different directions, such that {100}, for example, is a collective appellation of (100), (010) and (001).

The size of the single-crystal silicon substrate 1, sliced as the crystal surface orientation is prescribed, is optionally set in dependence upon the apparatus provided to a machining process line. For example, the single-crystal silicon substrate 1 used in the present embodiment is a cube 3 cm in length and 3 cm in width.

The thickness of the single-crystal silicon substrate 1, sliced as the orientation of the crystal surface orientation is prescribed, only needs to be at least larger than the thickness of the oscillator 11 formed in the vibration type gyrosensor device 10. In the present embodiment, in which the thickness t4 of the oscillator 111 is set to 100 μm, as shown in and described with reference to FIG. 3, the thickness of the single-crystal silicon substrate 1 is three times 100 μm, or 300 μm.

Referring to FIG. 6, thermal oxide films 2A, 2B, which are SiO$_2$ films, are formed by thermal oxidation on the major surfaces 1A and 1B of the single-crystal silicon substrate 1. These thermal oxide films 2A, 2B operate as protective films in carrying out crystal anisotropic etching as later explained. The thickness of the thermal oxide films 2A, 2B, which is arbitrary, is herein set to 0.1 μm. The conductivity type of the single-crystal silicon substrate 1, as used in the present embodiment, is the N type, however, the conductivity type may be determined arbitrarily.

In the following explanation, the other major surface 1A of the single-crystal silicon substrate 1, carrying the thermal oxide film 2A thereon, is the front surface, while the one major surface 1B, carrying the thermal oxide film 2B thereon, is the back surface.

First, the thermal oxide film 2B, formed on a location on the back surface of the single-crystal silicon substrate 1, on which to perform crystal anisotropic etching, is removed by photo-etching.

The photo-etching is roughly divided into a step of forming a resist film pattern, opened at the location of the thermal oxide film 2B where the film is to be removed (photolithographic step), and a step of removing the thermal oxide film 2B, using the above pattern (etching step).

Figure 7:
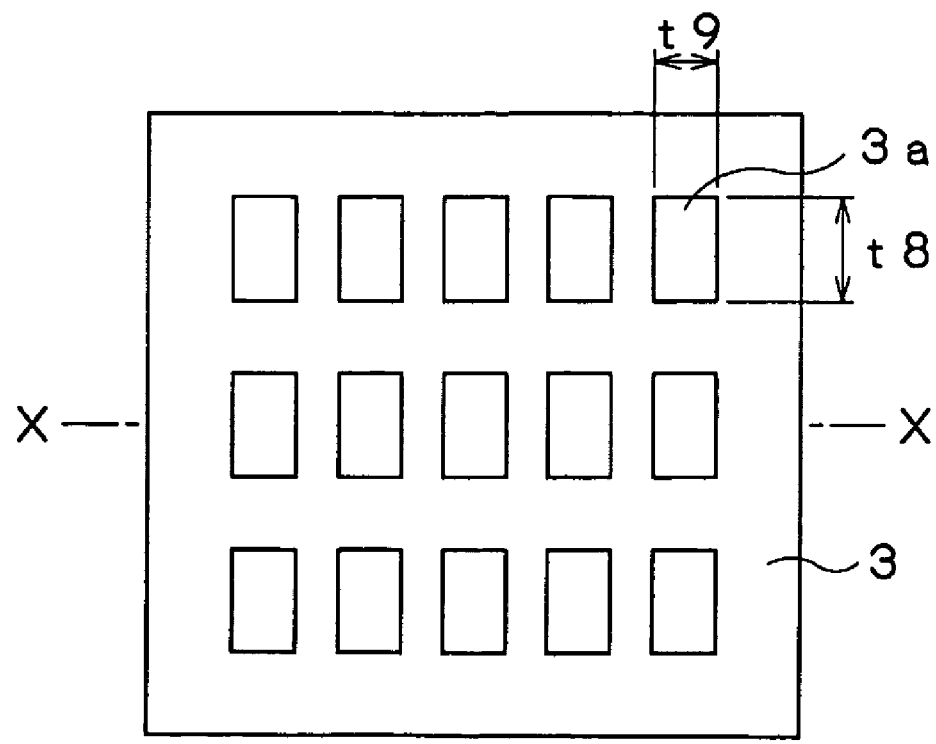
FIG. 7 is a plan view showing the state in which a resist film pattern has been formed on the single crystal silicon substrate.
Figure 8:
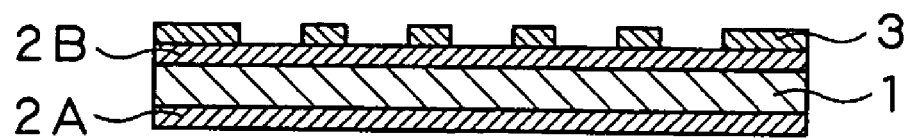
FIG. 8 is a cross-sectional view taken along line XX of the single crystal silicon substrate shown in FIG. 7.

FIG. 7 depicts a plan view showing that a resist pattern film 3 has been formed on the thermal oxide film 2B of the single-crystal silicon substrate 1, and FIG. 8 depicts a cross-sectional view of the single-crystal silicon substrate 1, taken along line XX of FIG. 7.

Referring to FIG. 7, the resist pattern film 3, formed on the thermal oxide film 2B, is of such a pattern in which a number of rectangular openings 3a, each having a size of t8×t9, where t8 is the length along a direction perpendicular to the {110} plane and t9 is the length along a direction parallel to the {110} plane, are regularly arrayed with preset separation between neighboring openings. In the present embodiment, the pattern comprises 3×5 openings 3a. Each of the openings 3a forms the sole vibration type gyrosensor device 10.

This resist pattern film 3 is formed by the same process as the photolithographic process used in the single-crystal machining process, that is, by a process comprising a step of heating the thermal oxide film 2B by micro-wave to remove the moisture, by way of pre-baking, a step of coating a photoresist film, as a photosensitizing resin, a step of exposing the mask, carrying thereon the aforementioned pattern for forming the above openings 3a, to light, and a development step.

The values of t8 and t9, determining the size of the opening 3a, are determined by the shape of the oscillator 11 of the vibration type gyrosensor device 10, thickness t1 of the single-crystal silicon substrate 1 and by the spatial widths t7a, t7b and t7c of the oscillator shown in FIG. 1. Meanwhile, the specified values of t8 and t9 will be explained subsequently in detail.

In this manner, the resist pattern film 3 is formed on the thermal oxide film 2B of the single-crystal silicon substrate 1.

Figure 9:
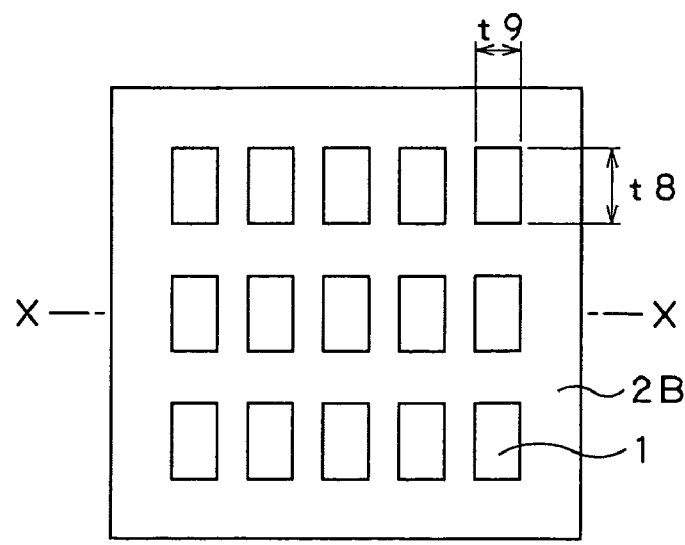
FIG. 9 is a plan view showing the state in which a thermal oxide film on the single crystal silicon substrate has been removed.

The thermal oxide film 2B, formed by the resist pattern film 3, is then etched off. FIG. 9 is a plan view showing the state of the single-crystal silicon substrate 1, freed only of the thermal oxide film 2B, formed on the site of the opening 3a, formed in turn by the resist pattern film 3, and FIG. 10 is a cross-sectional view showing the state in which the single-crystal silicon substrate 1, shown in FIG. 9, has been severed along line XX.

The etching used for removing the thermal oxide film 2B may be physical etching, such as ion etching, or wet etching. Nevertheless, in view of smoothness of the interface of the single-crystal silicon substrate 1, the wet etching, which removes only the thermal oxide film 2B, is preferred.

In the present embodiment, ammonium fluoride was used as a liquid drug for wet etching. However, in the case of the wet etching, prolonged etching leads to the increased etching proceeding from the lateral side of the opening, that is, to increased side etching. In this consideration, the etching time is to be controlled accurately so that the etching will be terminated at a time point when only the portion of the opening 3a of the thermal oxide film 2B has been removed.

Figure 10:
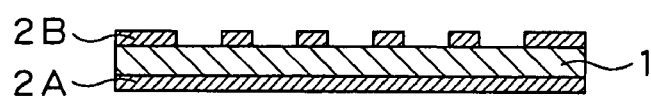
FIG. 10 is a cross-sectional view taken along line XX of FIG. 9 showing the single crystal silicon substrate.

By so doing, the thermal oxide film 2B, located in the opening 3a of the resist pattern film 3, is removed, as shown in FIG. 10.

Wet etching is then applied to the single-crystal silicon substrate 1, where the {100} surface has been exposed at the opening 2Ba of t8×t9, equal to the size of the opening 3a of the resist pattern film 3, as a result of removal of the thermal oxide film 2B by etching as described above, for reducing the thickness of the single-crystal silicon substrate 1 to t4 which is the thickness of the oscillator 11.

Figure 11:
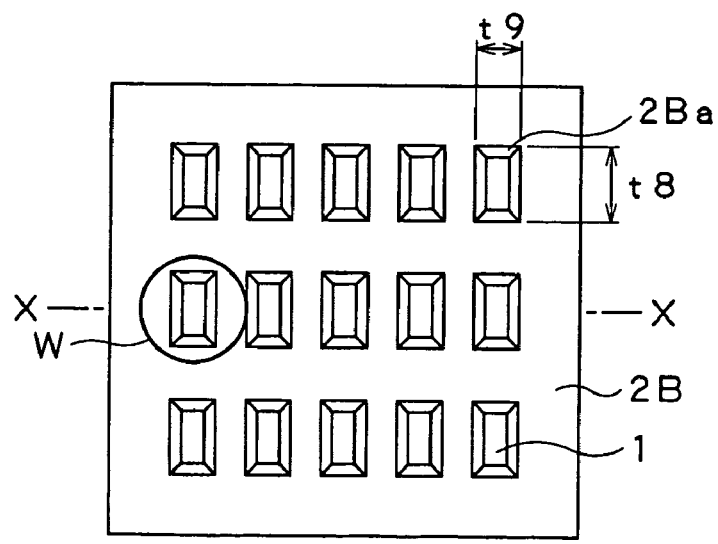
FIG. 11 is a plan view showing the state in which the single crystal silicon substrate has been subjected to crystal anisotropic etching.
Figure 12:
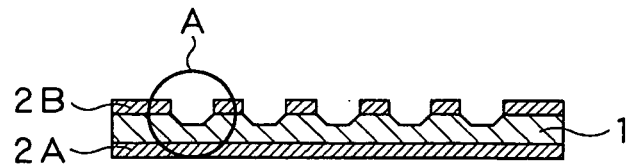
FIG. 12 is a cross-sectional view taken along line XX of the single crystal silicon substrate shown in FIG. 11.
Figure 13:
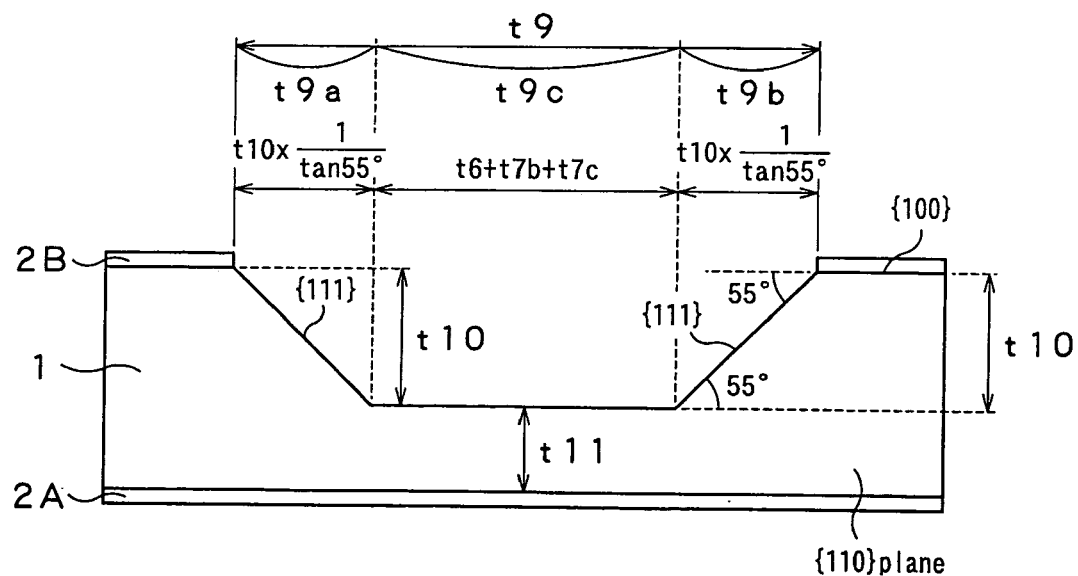
FIG. 13 is an enlarged cross-sectional view of an area A shown in FIG. 12.

FIG. 11 depicts a plan view showing the state in which the thermal oxide film 2B has been removed such that only the opening 2Ba of the size of t8×t9 has been produced on etching to expose the {100} surface. FIG. 12 depicts a cross-sectional view showing the single-crystal silicon substrate 1 of FIG. 11 sliced along line XX. FIG. 13 shows an area A of FIG. 12 to an enlarged scale.

It is noted that wet etching applied to the single-crystal silicon substrate 1 is the crystal anisotropic etching taking advantage of the properties that the etch rate depends on the crystal direction. In case the opening 2Ba, produced by removing the thermal oxide film 2B to expose the {100} plane, is subjected to crystal anisotropic etching, the {111} plane having the surface orientation of ca. 55° with respect to the {100} plane, as shown in FIG. 13, is presented. A so-called diaphragm shape is achieved by terminating the etching to provide t4 corresponding to the thickness of the oscillator 11.

In general, the etch rate of the single-crystal silicon substrate 1 has crystal direction dependency that the {111} plane may hardly be etched as compared to the {100} plane. Specifically, the etch rate of the {100} plane of the single-crystal silicon is of the order of 200 times that of the (111) plane.

The etching solution usable in applying crystal anisotropic etching to single crystal silicon may be exemplified by TMAH (tetramethyl ammonium hydride), KOH (potassium hydroxide), EDP (ethylenediamine-pyrocatechol-water) and hydrazine.

In the present embodiment, a 20% solution of TMAH (tetramethyl ammonium hydride), having a larger thermal oxide film 2A to thermal oxide film 2B etch rate selection ratio, was used as an etching solution. During etching, the temperature was kept at 80° C., as the etching solution was agitated, and etching was carried out for six hours until the depth t11 of the diaphragm was 200 μm, that is, until the residual thickness t11 of the single-crystal silicon substrate 1, was 100 μm corresponding to the thickness t4 of the oscillator 11.

For carrying out crystal anisotropic etching, the numerical values of t8 and t9, prescribing the size of the opening 3a, formed by the resist film pattern, explained with reference to FIG. 7, are explained in detail.

A width t9 of the opening 3a, that is, the width of the diaphragm, following the etching, is $t9=t9a+t9b+t9c$, as shown in FIG. 13.

t9c may be given by $t9c=t6+t7b+t7c$, using the width t6 of the oscillator 11 shown in FIG. 3, and the spatial widths t7b and t7c of the ambient spacing 12 formed around the oscillator 11 shown in FIG. 1.

t9a and t9b are of the same length and, as shown in FIG. 13, the {111} plane, which presents itself in carrying out crystal anisotropic etching, and the {100} plane, as the back surface of the single-crystal silicon substrate 1, make an angle of 55° to each other, t9a and t9b may be expressed as $t9a=t9b=t10\times 1/\tan 55°$, where t10 is the thickness of the diaphragm.

Consequently, the width t9 of the opening 3a is such that $t9=\{t10\times 1/\tan 55°\}\times 2+(t6+t7b+t7c)$. If t6=100 μm, t7b=t7c=200 μm and t10=200 μm, t9=780 μm.

In case the crystal anisotropic etching, described above, is carried out, the {111} plane, making an angle of 55° with respect to the {100} plane, is presented along the t8 direction in the opening 3a of the resist film pattern 3, as along the t9 direction. Hence, the length t8 of the opening, that is, the length of the as-etched diaphragm, may be expressed, using the length t5 of the oscillator 11, shown in FIG. 3, and the spatial width t7a of the ambient spacing 12, formed around the oscillator 11, shown in FIG. 1, by $t8=\{t10\times 1/\tan 55°\}\times 2+(t5+t7a)$. If t5=2.5 mm, t7a=200 μm and t10=200 μm, t8=2980 μm.

In the foregoing explanation, the single-crystal silicon substrate 1 in its entirety has been described with reference to the drawings. In the following, only the single-crystal silicon substrate 1, in which a diaphragm, indicated as an area W in FIG. 11, is formed, is used for explanation. Additionally, the following explanation is directed to the machining step for the thermal oxide film 2A. Hence, a plan view showing a front surface, which is the side thermal oxide film 2A, as an upper surface, and a cross-sectional view, taken at a preset position of the plan view, are used for explanation.

Figure 14:
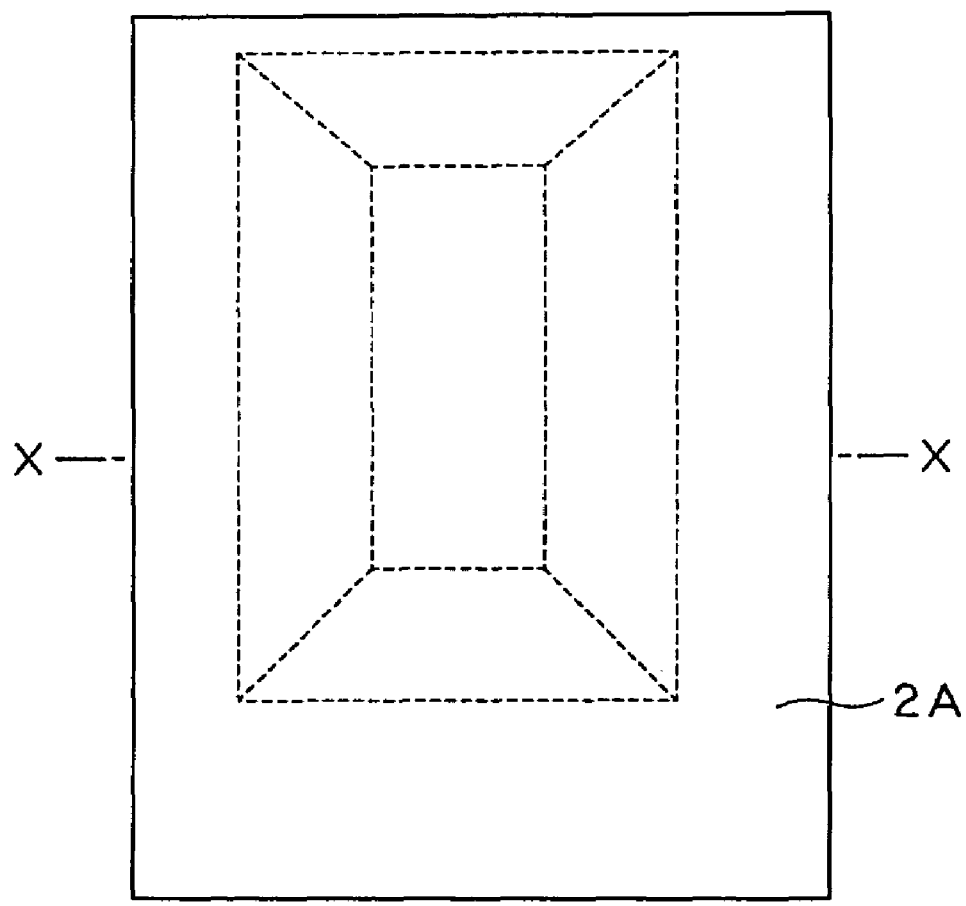
FIG. 14 is a plan view showing the state of a front surface of the single crystal silicon substrate.
Figure 15:
FIG. 15 is a cross-sectional view taken along line XX of the single crystal silicon substrate shown in FIG. 14.

Specifically, with the thermal oxide film 2A of the single-crystal silicon substrate 1, carrying a diaphragm of the area W, shown in FIG. 11, as an upper surface, the single-crystal silicon substrate 1 is as shown in the plan view of FIG. 14, with a cross-sectional view thereof, corresponding to the section taken along line XX, being as shown in FIG. 15.

Figure 16:
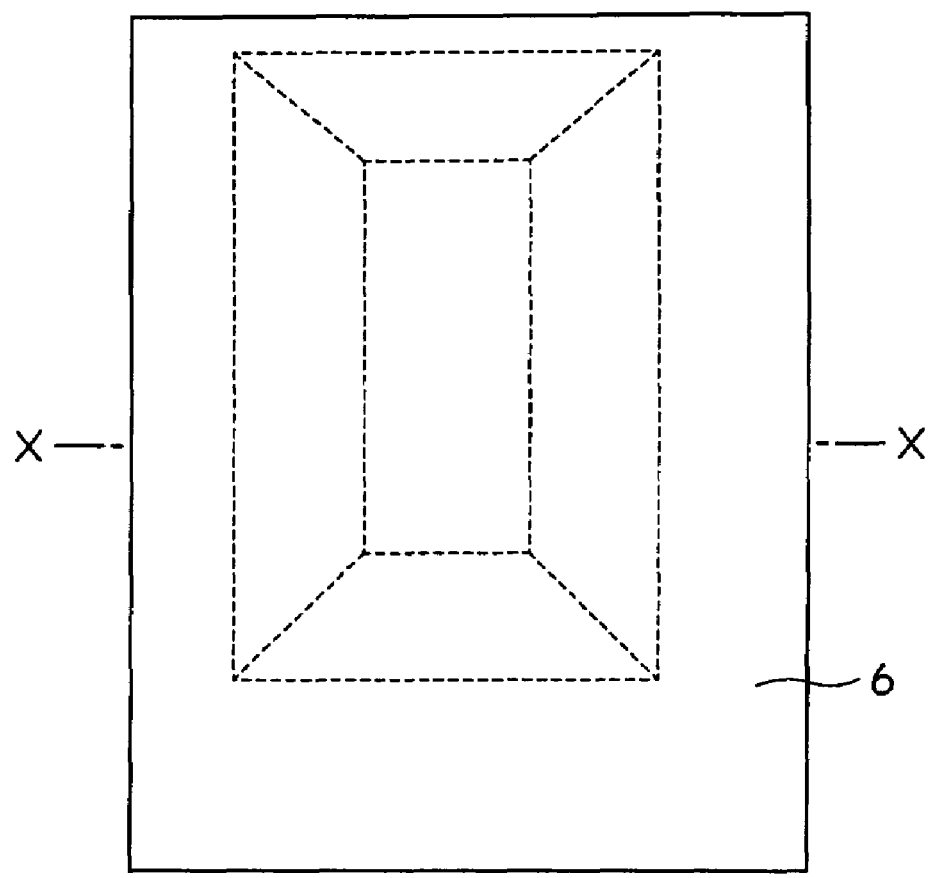
FIG. 16 is a plan view showing the state of the single crystal silicon substrate on which a lower electrode film, a piezoelectric film and an upper electrode film have been formed.
Figure 17:
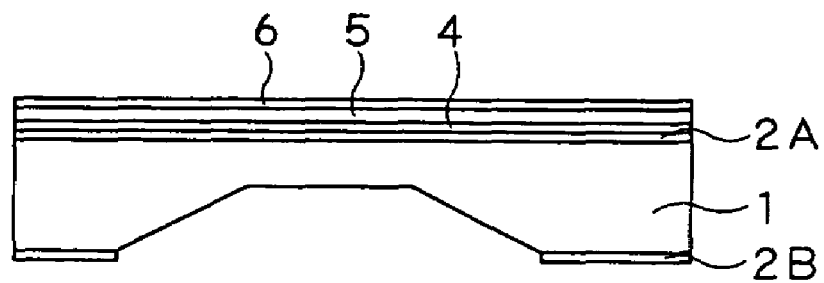
FIG. 17 is a cross-sectional view taken along line XX of FIG. 16 showing the single crystal silicon substrate.

A lower electrode film, a piezoelectric film and an upper electrode film, are then formed on the thermal oxide film 2A, for forming the reference electrode 4a, piezoelectric layer 5a, driving electrode 6a and the detection electrodes 6b, 6c. If a lower electrode film 4, a piezoelectric film 5 and an upper electrode film 6 are sequentially formed on the thermal oxide film 2A on the single-crystal silicon substrate 1, the single-crystal silicon substrate is as shown in the plan view of FIG. 16, with a cross-sectional view thereof, corresponding to the section taken along line XX in FIG. 16, being as shown in FIG. 17.

In the present embodiment, the lower electrode film 4, piezoelectric film 5 and the upper electrode film 6 were all formed using a magnetron sputtering device.

First, the lower electrode film 4 was formed on the thermal oxide film 2A. In the present embodiment, the conditions of the magnetron sputtering device were set so that the gas pressure and the RF power were set to 0.5 Pa and to 1 kW, respectively, and titanium (Ti) was deposited on the thermal oxide film 2A to a film thickness of 50 nm. With the gas pressure and the RF power, as the conditions of the magnetron sputtering device, set to 0.5 Pa and 0.5 kW, platinum Pt was deposited to a film thickness of 200 nm. That is, the lower electrode film 4 was formed by depositing titanium and platinum to the above film thicknesses.

The piezoelectric film 5 was then formed on the lower electrode film 4. In the present embodiment, a $Pb_{(1+x)}(Zr_{0.53}Ti_{0.47})O_{3-y}$ oxide was used as a target and, as the conditions of the magnetron sputtering device were set to ambient temperature, a gas pressure of 0.7 Pa and to 0.5 kW of the RF power, a thin piezoelectric layer of lead zirconate titanate (PZT) was formed to a film thickness of 1 µm on the platinum (Pt) film, deposited as the lower electrode film 4. The single-crystal silicon substrate 1, on which the film of lead zirconate titanate (PZT) was formed, was charged into an electrical oven and crystallizing heat treatment was carried out at 700° C. for ten minutes in an oxygen atmosphere to form the piezoelectric film 5.

Finally, the upper electrode film 6 was formed on the piezoelectric film 5. In the present embodiment, the gas pressure and the RF power, as the conditions for the magnetron sputtering device, were set to 0.5 Pa and 0.5 kW, respectively, and platinum Pt was formed on the piezoelectric film 5 to a film thickness of 200 nm.

Figure 18:
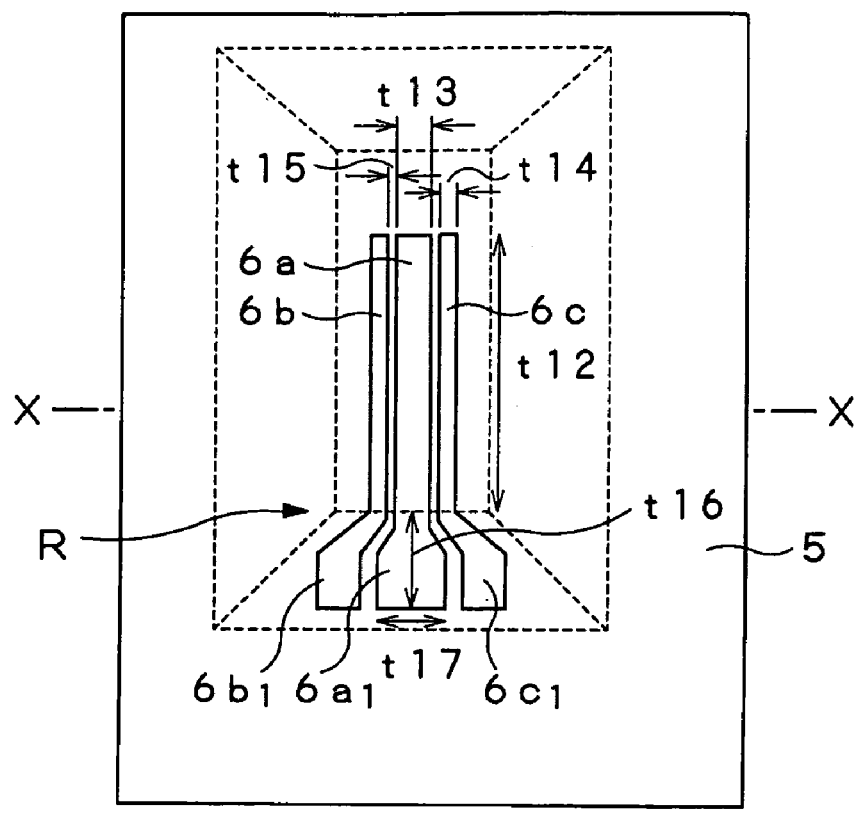
FIG. 18 is a plan view showing the state of the single crystal silicon substrate on which the driving electrode and the detection electrodes have been formed.
Figure 19:
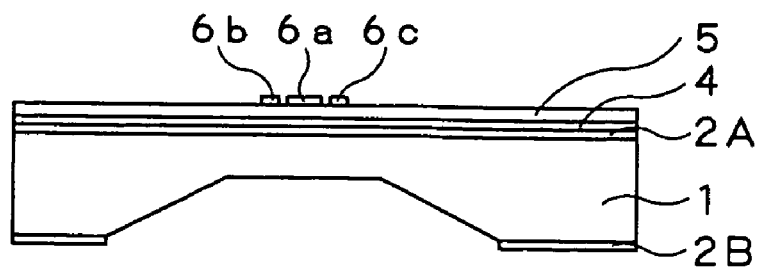
FIG. 19 is a cross-sectional view taken along line XX of FIG. 18 showing the single crystal silicon substrate.

The upper electrode film 6 was then worked to form the driving electrode 6a and the detection electrodes 6b, 6c. FIG. 18 is a plan view showing the state of the single-crystal silicon substrate 1, on which the driving electrode 6a and the detection electrodes 6b, 6c were formed, and FIG. 19 is a cross-sectional view taken along line XX of FIG. 18 showing the single-crystal silicon substrate 1.

The driving electrode 6a is an electrode to which is applied the voltage for driving the oscillator 11 as described above. The driving electrode is formed so as to be at the center of the oscillator 11. The detection electrodes 6b, 6c are used for detecting the Corioris force produced in the oscillator 11. The detection electrodes are formed parallel to the driving electrode 6a on both sides of the driving electrode 6a so as to be free of contact with one another.

Referring to FIG. 18, the driving electrode 6a and the detection electrodes 6b, 6c are formed so that one ends thereof are coincident with the root line R at the root end of the oscillator 11. The aforementioned one ends of the respective electrodes are provided with terminal junctions $6a_1$, $6b_1$ and $6c_1$.

In the present embodiment, the width t13 of the driving electrode 6a is set to 50 µm, the width t14 of each of the detection electrodes 6b, 6c is 10 mm, the length t12 of the driving electrode 6a and the detection electrodes 6b, 6c, and the spacing t15 between the driving electrode 6a and the detection electrodes 6b, 6c was set to 5 µm. The driving electrode 6a and the detection electrodes 6b, 6c may be of an optional size insofar as the electrodes can be formed on the oscillator 11. In the present embodiment, the length t16 and the width t17 of each of the terminal junctions $6a_1$, $6b_1$ and $6c_1$ were set to 50 µm and to 50 µm, respectively.

In the present embodiment, the driving electrode 6a, detection electrodes 6b, 6c and the terminal junctions $6a_1$, $6b_1$ and $6c_1$ were formed by first forming a resist film pattern on the upper electrode film 6, using the photolithographic technique, and by then removing unneeded portions of the electrode film 6, using the ion etching technique.

The present invention is not limited to this method for forming the driving electrode 6a, detection electrodes 6b, 6c and the terminal junctions $6a_1$, $6b_1$ and $6c_1$, such that various other suitable methods may also be used.

Figure 20:
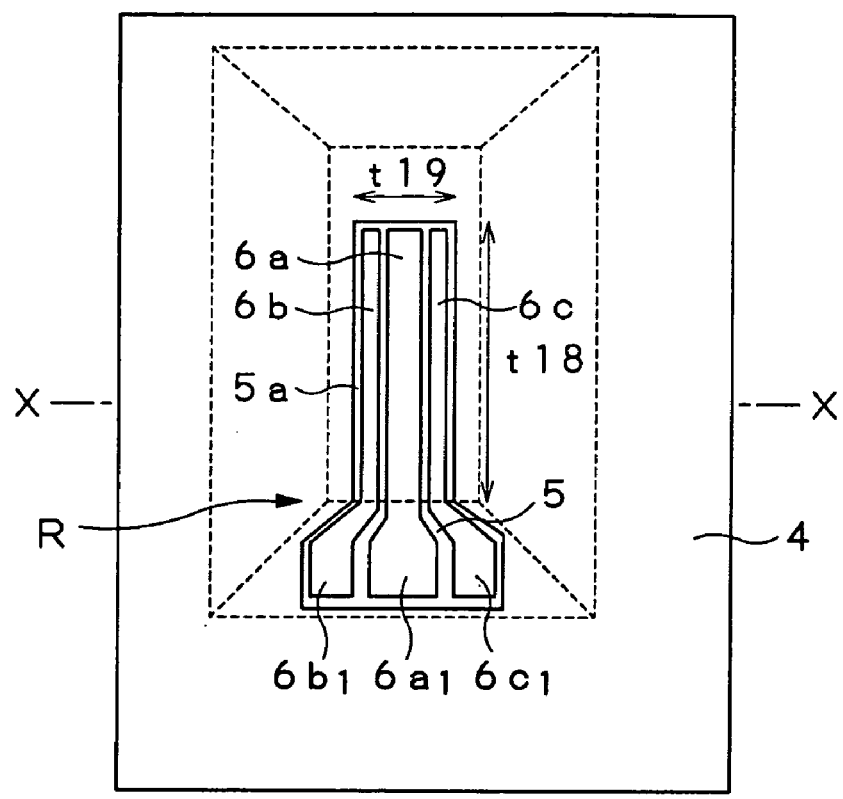
FIG. 20 is a plan view showing the state of the single crystal silicon substrate on which a piezoelectric layer has been formed.
Figure 21:
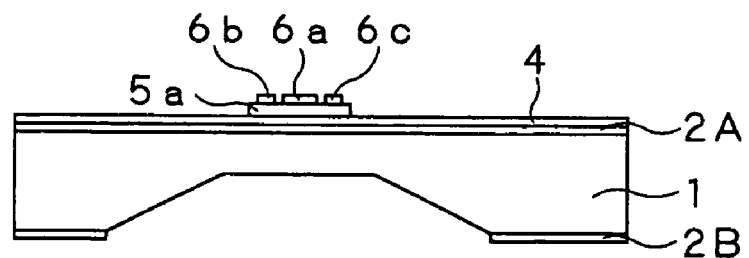
FIG. 21 is a cross-sectional view taken along line XX of FIG. 20 showing the single crystal silicon substrate.

The piezoelectric film 5 is then processed to form the piezoelectric layer 5a. FIG. 20 depicts a plan view showing the state of the single-crystal silicon substrate 1 on which piezoelectric layer 5a has been formed by machining the piezoelectric film 5. FIG. 21 is a cross-sectional view taken along line XX of FIG. 20 showing the single-crystal silicon substrate 1.

The piezoelectric layer 5a may be of any suitable shape as long as it completely covers the driving electrode 6a and the detection electrodes 6b, 6c formed by machining the upper electrode film 6.

In the present embodiment, the length t18 and the width t19 of the piezoelectric layer 5a were set to 2.2 mm and to 90 µm, respectively. With this dimension of the piezoelectric layer 5a, the center of the piezoelectric layer 5a is coincident with the center of the oscillator 11, with one end of the piezoelectric layer coinciding with the root line R which forms the root of the oscillator 1.

The width t18 of the piezoelectric layer 5a needs to be not larger than the width t4 of the oscillator 11. Moreover, in the present embodiment, the piezoelectric film 5 is left below the terminal junctions $6a_1$, $6b_1$, and $6c_1$, with an allowance of 5 µm from the outer rim of the terminal junctions $6a_1$, $6b_1$, and $6c_1$. The piezoelectric film 5, left below the terminal junctions $6a_1$, $6b_1$, and $6c_1$, may optionally be set depending on the overall shape and size of the vibration type gyrosensor device 10 in its entirety.

In the present embodiment, the piezoelectric layer 5a was formed by first forming a resist film pattern of the shape of the piezoelectric film 5, to be left below the piezoelectric layer 5a and the terminal junctions 6a, 6b, and 6c, using the photolithographic technique, and by then removing unneeded portions of the piezoelectric film 5, by wet etching employing a fluoronitric acid solution.

In the present embodiment, wet etching is used as a technique of removing the unneeded portions of the piezoelectric film 5 for forming the piezoelectric layer 5a. The present invention is, however, not limited to this removing technique, such that a removing technique by ion etching, as physical etching, or reactive ion etching (RIE), carrying out etching by both the chemical action and the physical action, may also be used.

Figure 22:
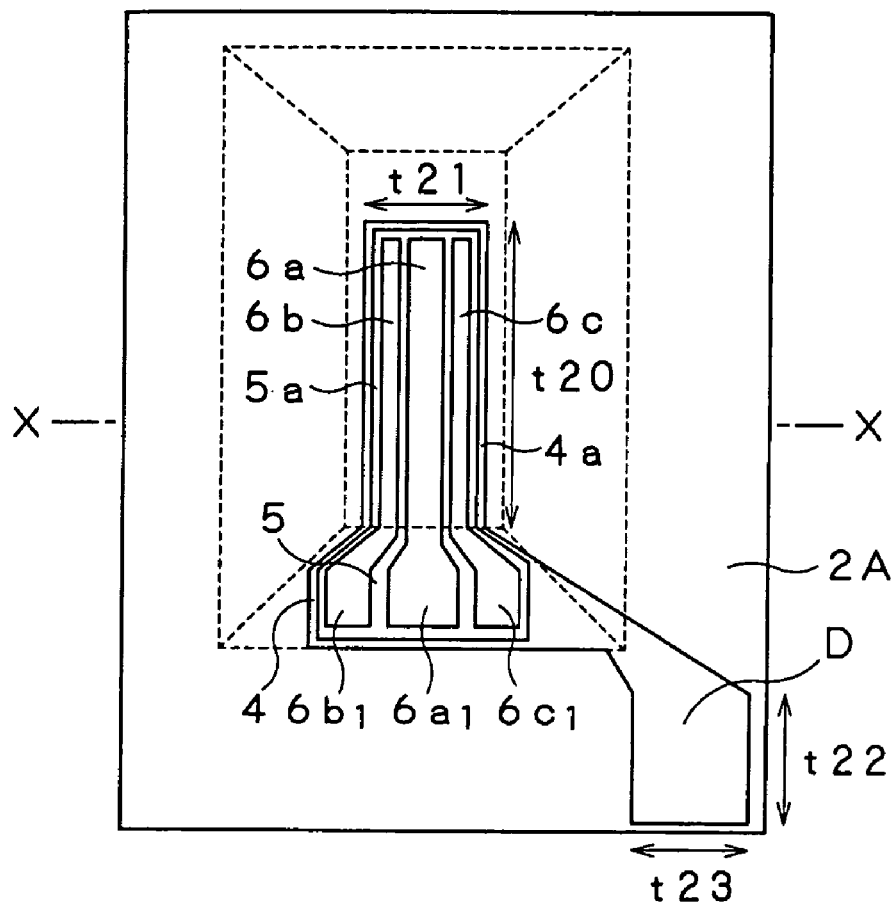
FIG. 22 is a plan view showing the state of the single crystal silicon substrate on which a reference electrode has been formed.
Figure 23:
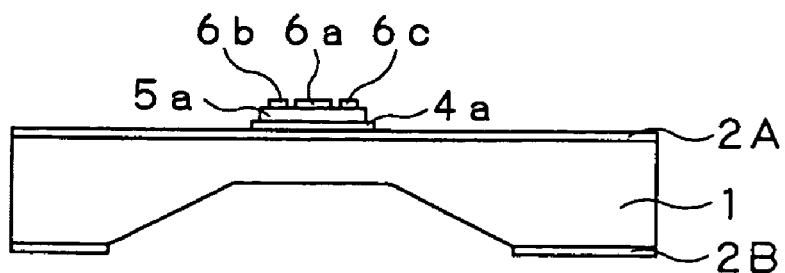
FIG. 23 is a cross-sectional view taken along line XX of the single crystal silicon substrate shown in FIG. 22.

The lower electrode film 4 is then processed to form a reference electrode 4a. FIG. 22 depicts a plan view showing the state of the single-crystal silicon substrate 1 on which the reference electrode 4a has been formed by machining the lower electrode film 4. FIG. 23 depicts a cross-sectional view taken along line XX of FIG. 22 showing the single-crystal silicon substrate 1.

The reference electrode 4a may be of any suitable form provided that the reference electrode completely covers up the piezoelectric layer 5a formed by machining the lower electrode film 4.

In the present embodiment, the length t20 and the width t21 of the reference electrode 4a were set to 2.3 mm and 94 µm, respectively. With this dimension of the piezoelectric layer 5a, the center of the piezoelectric layer 5a is coincident with the center of the oscillator 11, with one end of the piezoelectric layer coinciding with the root line R which forms the root of the oscillator 1.

The width t20 of the reference electrode 4a needs to be not larger than the width t4 of the oscillator 11. Moreover, in the present embodiment, the piezoelectric film 5 is left below the piezoelectric film 5, left intact, with an allowance of 5 μm from the outer rim of the piezoelectric film 5. This width may optionally be set depending on the overall shape and size of the vibration type gyrosensor device 10 in its entirety.

A conductor interconnecting terminal D is formed by the lower electrode film 4, as shown in FIG. 22, for establishing electrical connection with the outside. The reference electrode 4a and the conductor interconnecting terminal D are electrically connected to each other by the lower electrode film 4 left below the piezoelectric film 5.

The present embodiment is premised on employing wire bonding for establishing the electrical connection between the vibration type gyrosensor device 10 and the outside. Consequently, the portion of the terminal for connection of the conductor interconnecting terminal D, actually needed at the time of the wire bonding, is to be reserved.

In the present embodiment, the length t22 and the width t23 of the terminal part of the conductor interconnecting terminal D are set to 200 μm and to 100 μm, respectively. The manner of connection of the vibration type gyrosensor device 10 to the outside, inclusive of the method for connection, is optional, and the conductor interconnecting terminal D is set to an optional shape, depending on the method for connection used.

In the present embodiment, the reference electrode 4a, the conductor interconnecting terminal D and the lower electrode film 4, electrically interconnecting the reference electrode 4a and the conductor interconnecting terminal D, were formed by removing unneeded portions of the lower electrode film 4 by ion etching, following the deposition of the resist film pattern shaped as shown in FIG. 22 by the photolithographic technique.

In the present embodiment, described above, the technique used for removing unneeded portions of the lower electrode film 4 for forming the reference electrode 4a is the ion etching which is the physical etching. The present invention is, however, not limited to this removing technique, such that a removing technique by wet etching, as chemical etching, or reactive ion etching (RIE), carrying out etching by both the chemical action and the physical action, may also be used.

A planarizing resist film 7 is then formed for smoothing the terminal junctions $6a_1$, $6b_1$ and $6c_1$ and the conductor interconnecting terminals A, B and C, provided on one ends of the driving electrode 6a and the detection electrodes 6b, 6c, respectively.

Figure 24:
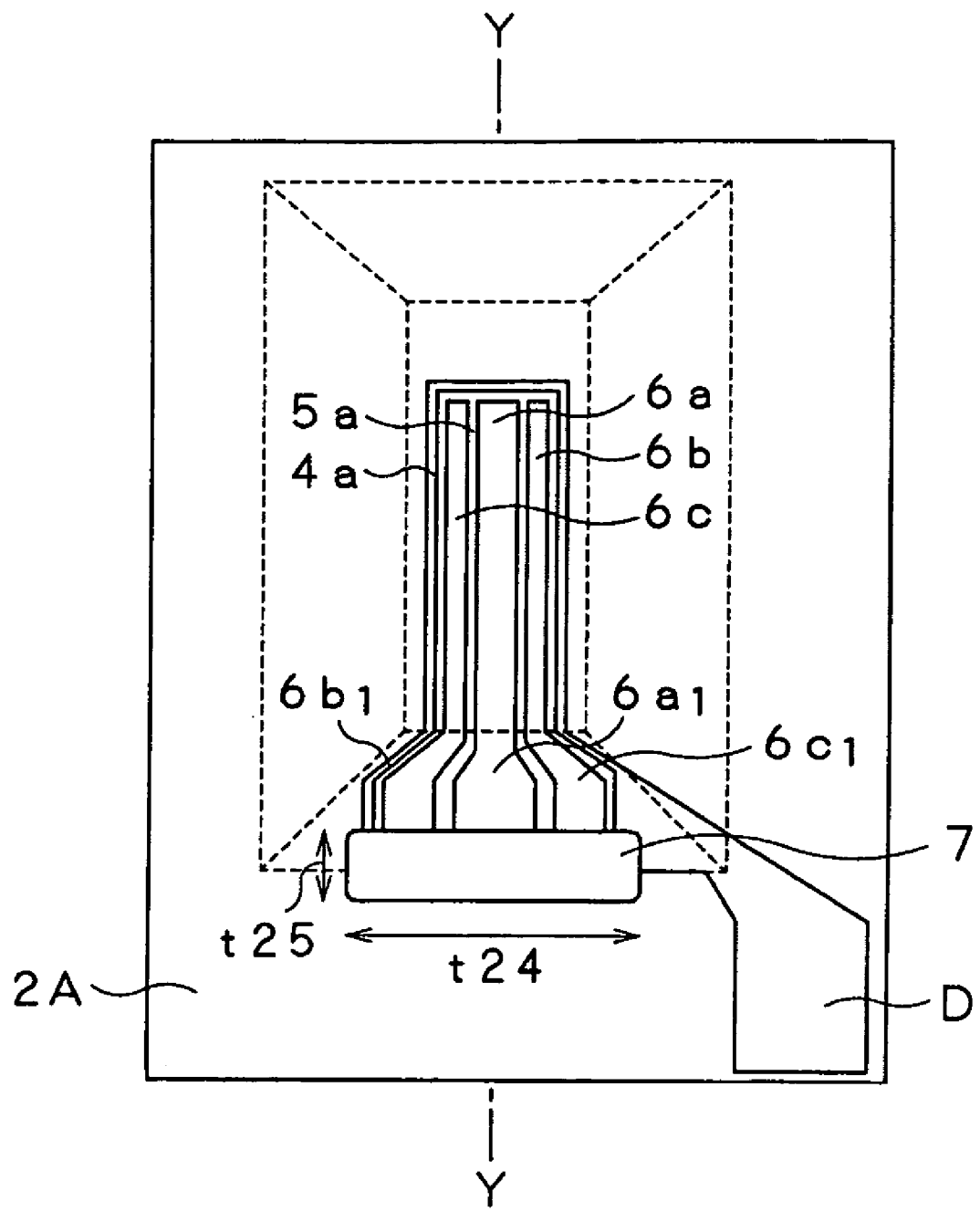
FIG. 24 is a plan view showing the state of the single crystal silicon substrate on which a planarizing resist film has been formed.
Figure 25:
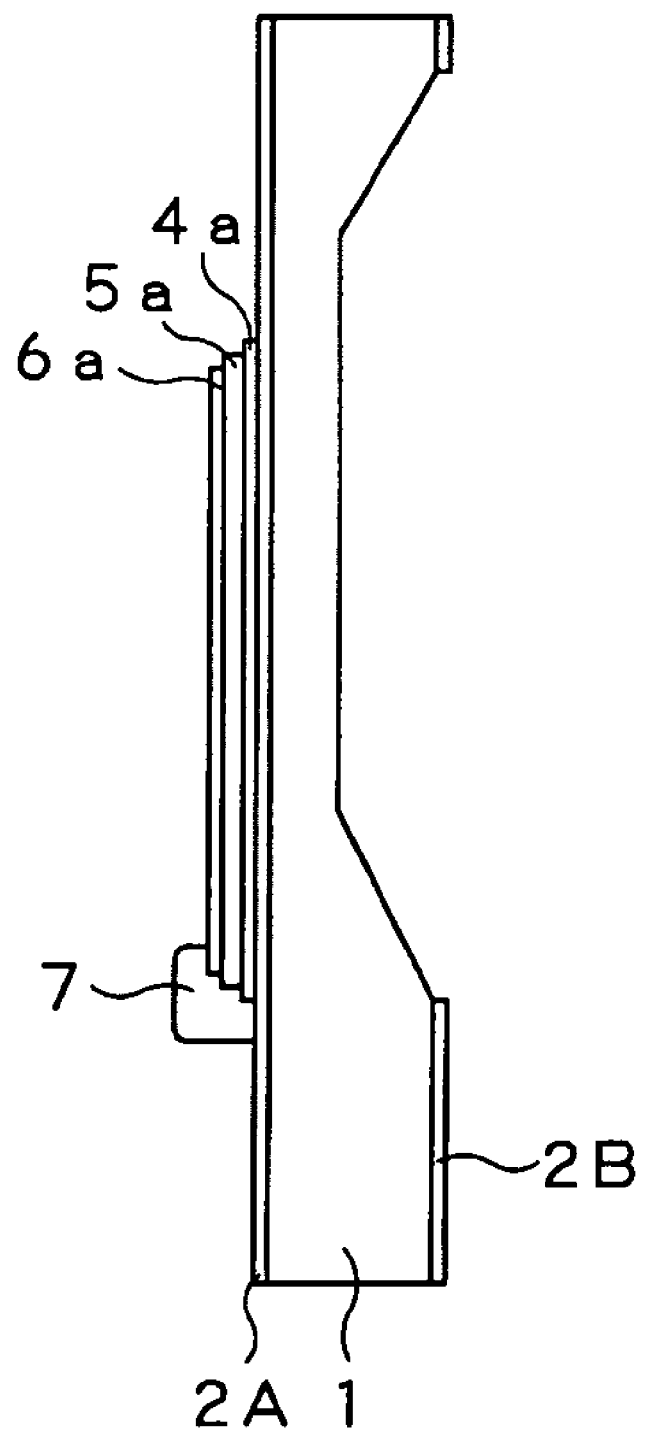
FIG. 25 is a cross-sectional view taken along line YY of the single crystal silicon substrate shown in FIG. 24.

FIG. 24 depicts a plan view showing the state of the single-crystal silicon substrate 1 on which the planarizing resist film 7 has been formed. FIG. 25 is a cross-sectional view taken along line YY of FIG. 24 showing the single-crystal silicon substrate 1.

For physically bonding the conductor interconnecting terminals A, B and C and the terminal junctions $6a_1$, $6b_1$ and $6c_1$, the bonding has to pass through the end of the piezoelectric film 5, left at the time of forming the piezoelectric layer 5a, and also through the end of the lower electrode film 4 (see FIG. 22).

In the present embodiment, the piezoelectric layer 5a is formed by wet etching the piezoelectric film 5. The etched end is reversely tapered towards the single-crystal silicon substrate 1, or is upstanding in shape. Thus, if an interconnection film is formed for electrically interconnecting the terminal junctions $6a_1$, $6b_1$, and $6c_1$, and the conductor interconnecting terminals A, B and C, without forming the planarizing resist film 7, the risk is high that the electrical interconnection is interrupted by the step difference of the etched end.

In addition, since the end of the lower electrode film 4, electrically connected to the reference electrode 4a, is exposed, the driving electrode 6a and the detection electrodes 6b, 6c on one hand and the reference electrode 4a on the other hand are electrically shorted, except if the planarizing resist film 7 is formed.

For the above reason, the planarizing resist film 7 is formed on the terminal junctions $6a_1$, $6b_1$, and $6c_1$, as shown in FIG. 24, so as to eliminate the step difference at the end of the piezoelectric film 5 to prevent the end of the lower electrode film 4 from becoming exposed.

The shape of the planarizing resist film 7 may optionally set insofar as the shape is such as eliminates the step difference at the end of the piezoelectric film 5 to inhibit the end of the lower electrode film 4 from becoming exposed, as described above. In the present embodiment, the width t24 and the length t25 are set to 200 μm and 50 μm, respectively.

The planarizing resist film 7 is cured by heat-treating a resist film, patterned by the photolithographic technique to a desired shape at a location indicated in FIG. 24, at a temperature of the order of 280 to 300° C. In the present embodiment, the thickness of the resist film is set to ca. 2 μm. It is however desirable that this thickness is varied, depending on the thickness of the piezoelectric film 5 or of the lower electrode film 4, so that the thickness of the film 7 is not less than the sum of the thicknesses of the latter two films. Moreover, the planarizing resist film 7 is formed, in the present embodiment, using a resist film. It is however possible that an electrically non-conductive material, capable of avoiding the above risk, may be used for forming the film 7. The forming method is also arbitrary.

Figure 26:
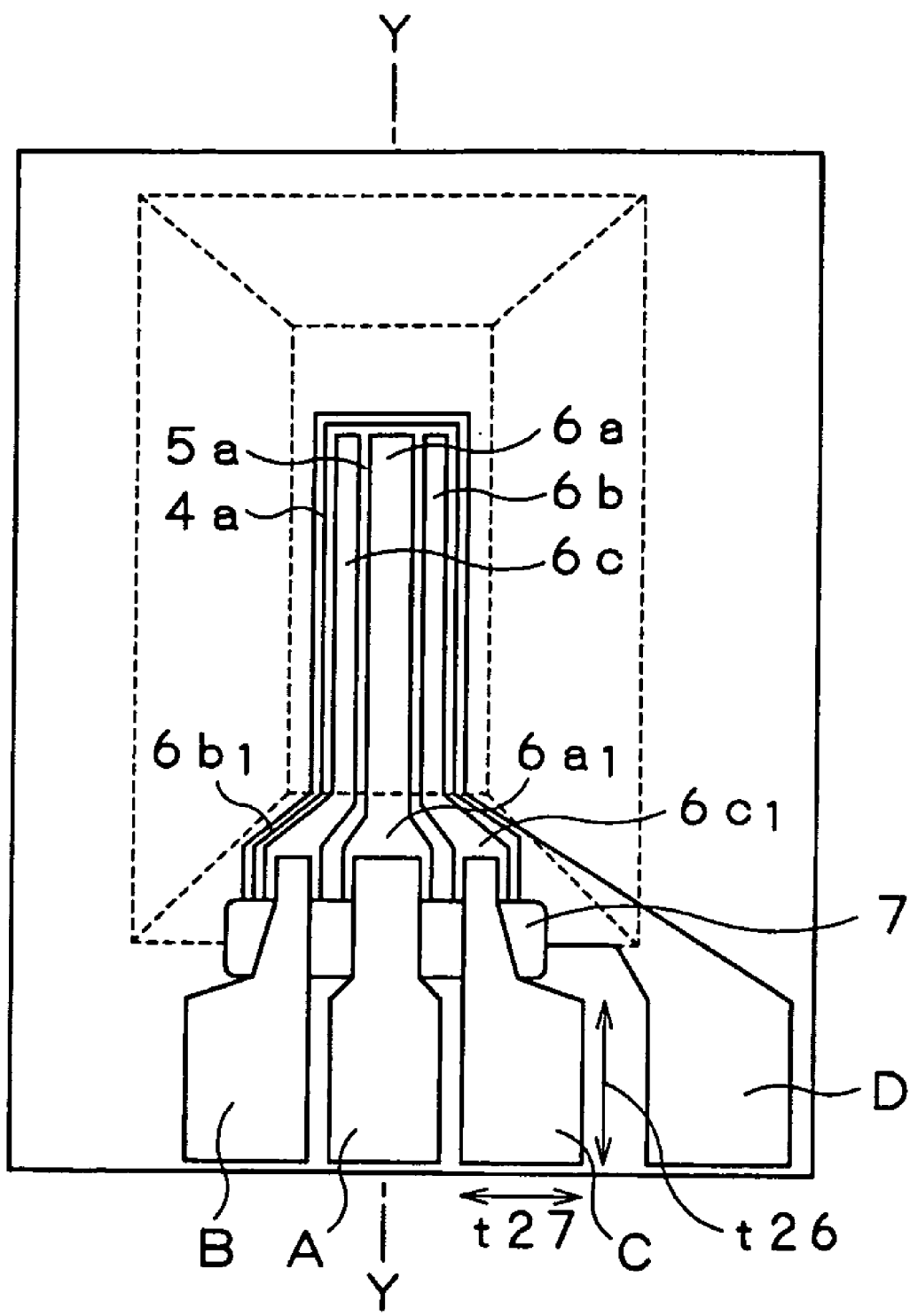
FIG. 26 is a plan view showing the state of the single crystal silicon substrate on which a conductor interconnecting terminals have been formed.
Figure 27:
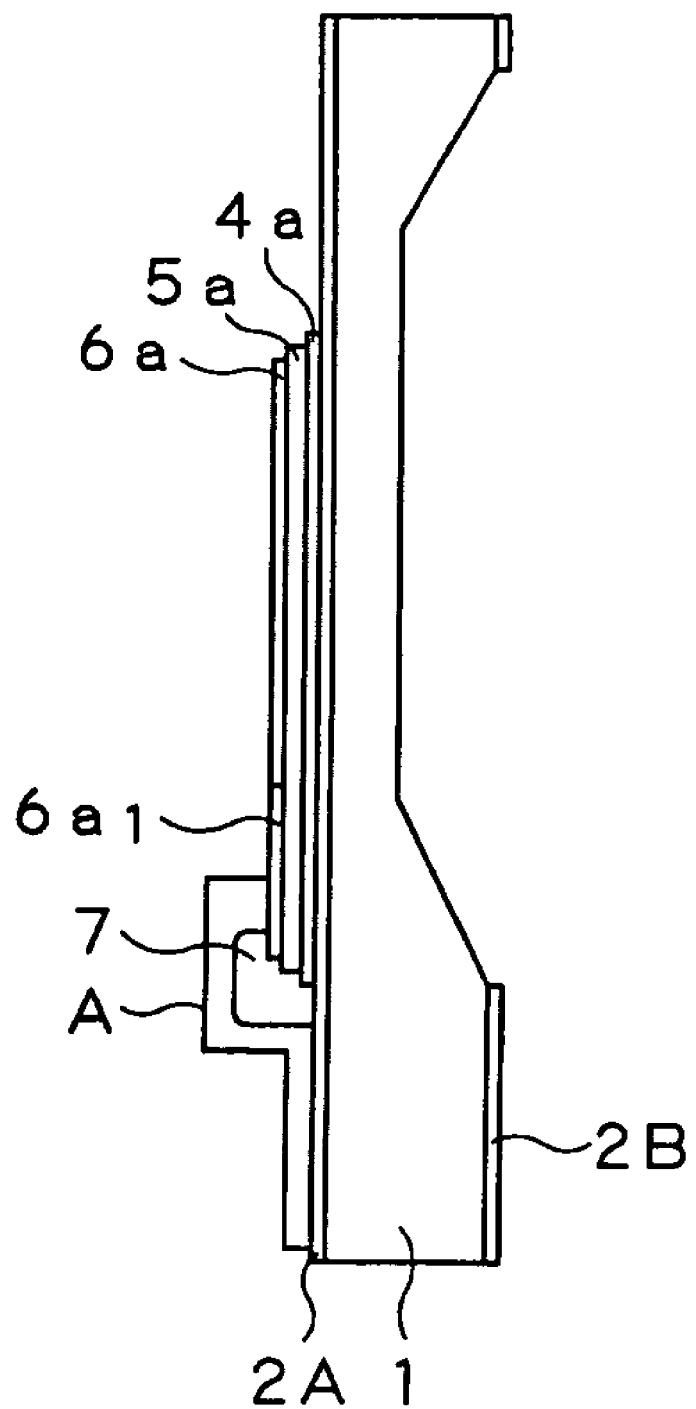
FIG. 27 is a cross-sectional view taken along line YY of the single crystal silicon substrate shown in FIG. 26.

The conductor interconnecting terminals A, B and C, used for carrying out the interconnection processing for connecting the driving electrode 6a and the detection electrodes 6b, 6c to outside, are then formed. FIG. 26 depicts a plan view showing the state of the single-crystal silicon substrate 1, carrying the conductor interconnecting terminals A, B and C thereon, and FIG. 27 is a cross-sectional view taken along line YY of FIG. 26, showing the single-crystal silicon substrate 1.

The conductor interconnecting terminals A, B and C, shown in FIG. 26, are connected to the terminal junctions $6a_1$, $6b_1$ and $6c_1$ of the driving electrode 6a and the detection electrodes 6b, 6c, respectively. The present embodiment is premised on employing wire bonding for establishing the electrical connection between the vibration type gyrosensor device 10 and the outside. Consequently, the portion of the terminal for connection of the conductor interconnecting terminals A, B and C, actually needed at the time of the wire bonding, is to be reserved, as with the aforementioned conductor interconnecting terminal D.

The conductor interconnecting terminals A, B and C are formed on the thermal oxide film 2A, as the terminals are conducted on the upper surface of the planarizing resist film 7 into contact with the terminal junctions $6a_1$, $6b_1$ and $6c_1$, respectively. Although the electrode bonding sites, as the sites of bonding of the conductor interconnecting terminals A, B and C and the terminal junctions $6a_1$, $6b_1$ and $6c_1$, may be of an optional shape, those electrode bonding sites are preferably 5 μm square in size for decreasing the electrical contact resistance.

The terminal portions of the conductor interconnecting terminals A, B and C, where actually the conductors are connected together, are shaped such as to provide an area necessary for wire bonding.

In the present embodiment, the length t26 and the width t27 of the terminal parts of the conductor interconnecting terminals A, B and C are set to 200 μm and to 100 μm, respectively. The connection of the vibration type gyrosensor device 10, inclusive of the bonding method, is optional, such that the connection may be set to optimize the shape of the conductor interconnecting terminals A, B and C, depending on the particular bonding method used.

In the present embodiment, the resist film pattern, shown in FIG. 26, is first formed, using the photolithographic technique, and the conductor interconnecting terminals A, B and C are then formed, using the sputtering. A film deposited on an unneeded portion during the sputtering was removed by a so-called lift-off technique whereby the unneeded film may be removed simultaneously at the time of removing the resist film pattern.

Specifically, the conductor interconnecting terminals A, B and C are formed by depositing titanium (Ti), improving the bonding force, by 200 μm, then depositing copper (Cu), low in cost and in electrical resistance, by 300 μm, and further by depositing gold (Au), assuring facilitated connection to wire bondung, by 300 μm. It is noted that the materials used in forming the conductor interconnecting terminals A, B and C, and the method for forming the conductor interconnecting terminals A, B and C, are optional, such that the present invention is not limited to the above materials or forming methods.

Figure 28:
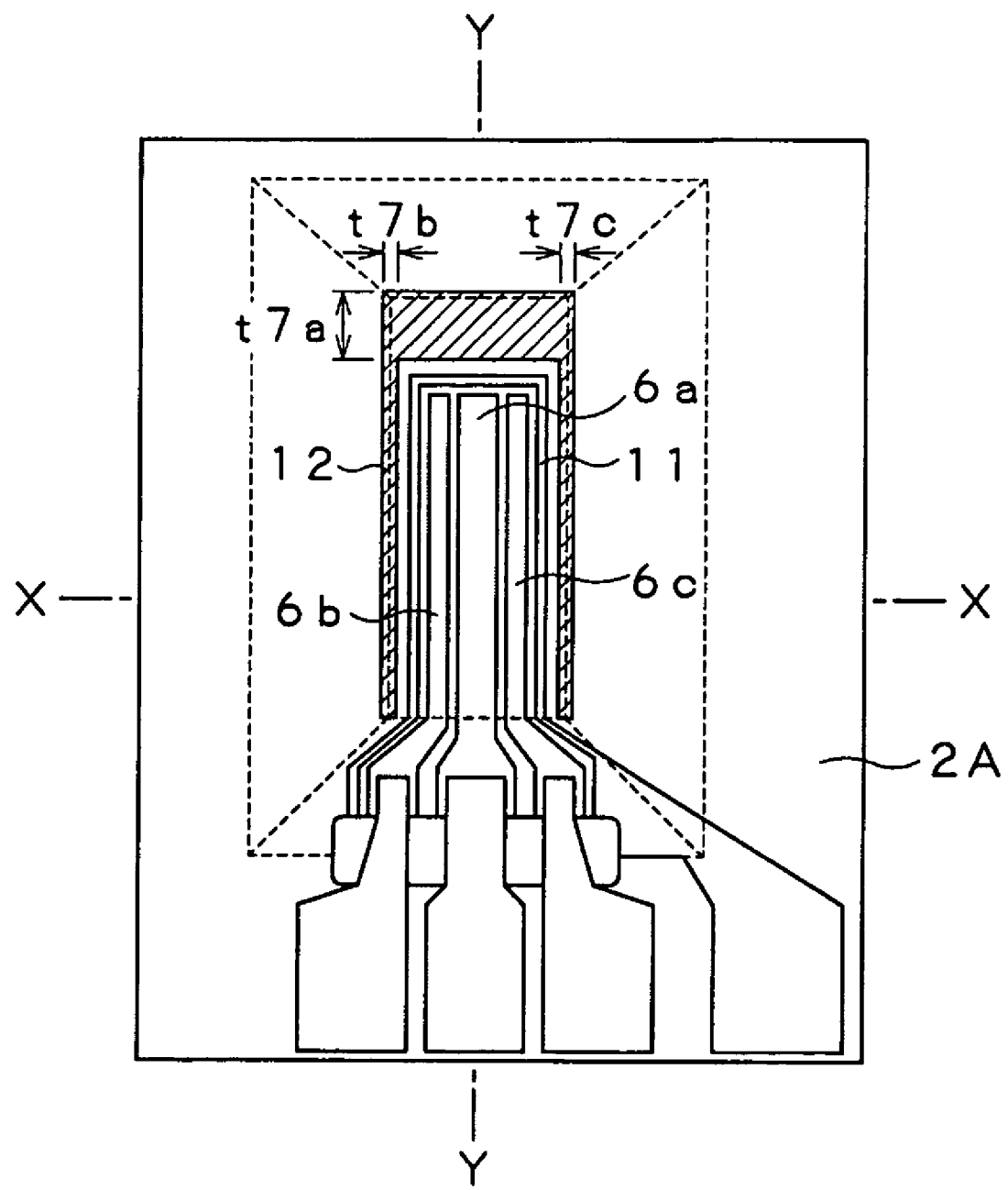
FIG. 28 is a plan view showing the state of the single crystal silicon substrate in which an ambient space has been formed around the oscillator by reactive ion etching.
Figure 29:
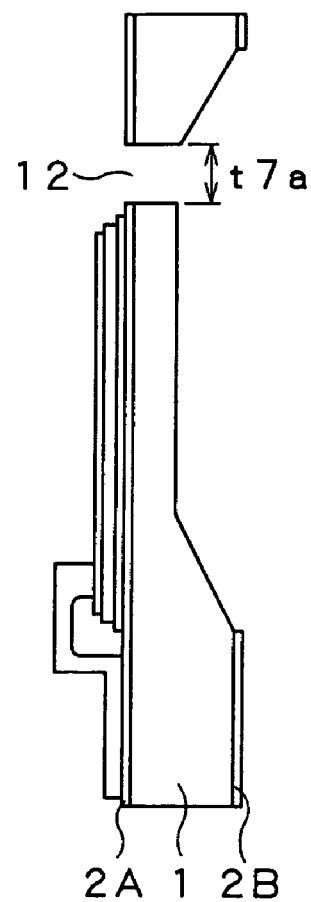
FIG. 29 is a cross-sectional view taken along line YY of the single crystal silicon substrate shown in FIG. 28.
Figure 30:
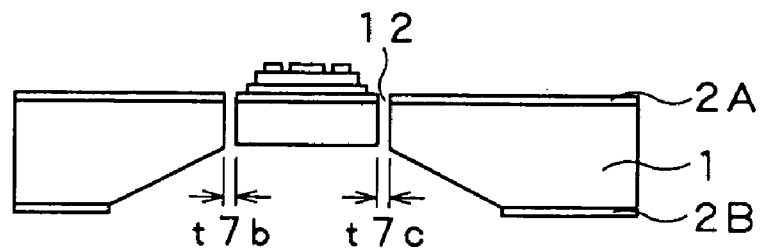
FIG. 30 is a cross-sectional view taken along line XX of the single crystal silicon substrate shown in FIG. 28.

The next following steps are the steps of forming the cantilevered oscillator 11 by forming the ambient spacing 12 for the vibration type gyrosensor device 10. FIG. 28 is a plan view showing the state in which the cantilevered oscillator 11 has been formed by providing the ambient spacing 12 in the single-crystal silicon substrate 1. FIG. 29 is a cross-sectional view taken along line YY of the single crystal silicon substrate shown in FIG. 28. FIG. 30 is a cross-sectional view taken along line XX of the single crystal silicon substrate shown in FIG. 28.

Referring to FIG. 28, the ambient spacing 12 is a U-shaped space delimited by a spacing having a width t7b towards left from a lateral side of the oscillator 11 where the detection electrode 6b is formed, a spacing having a width t7c towards right from a lateral side of the oscillator 11 where the detection electrode 6c is formed, and a spacing having a width t7a on an end opposite to the root line R of the oscillator 11 along the longitudinal direction of the oscillator 11.

In the present embodiment, the widths t7b and t7c are both set to 200 μm. These widths t7b and t7c are determined by the state of the gas in the ambient spacing 12 or by the Q-value indicating the quality of vibrations required of the oscillator 11.

In the present embodiment, the U-shaped resist pattern film, shown in FIG. 28, is formed on the thermal oxide films 2A. The thermal oxide film 2A then is removed by ion etching. Although wet etching may be used for removing the thermal oxide film 2A, ion etching is preferred in consideration of the dimensional error ascribable to side etching.

The U-shaped single-crystal silicon substrate 1, freed of the thermal oxide films 2A, is partially etched off by reactive ion etching (RIE) to form the ambient spacing 12.

In the present embodiment, the oscillator 11 having a perpendicular sidewall surface was formed by a Bosch process (Bosch Company) comprising repeating the etching step and step of forming a sidewall protecting film for the etched site, using an etching device having an inductively coupled plasma.

With the use of the above Bosch process, the oscillator 11 having a perpendicular sidewall surface may be formed by generating a high density plasma by ICP and by alternately introducing SF6 for etching and a C4F8 gas for sidewall protection, as etching is carried out at an etch rate of 10 m per minute.

Figure 31:
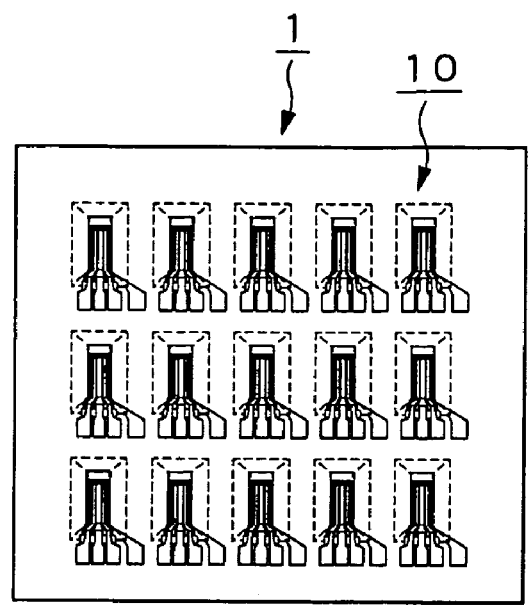
FIG. 31 is a plan view showing a single crystal silicon substrate on which plural vibration type gyrosensor devices have been formed.

By the above process, the main steps of forming piezoelectric elements, shaping and forming the interconnections, pertinent to the preparation of the vibration type gyrosensor devices 10, may be completed, such that a plural number of, herein 5×3, vibration type gyrosensor devices 10, are formed in the single-crystal silicon substrate 1, as shown for example in FIG. 31.

The number of the vibration type gyrosensor devices 10, formed in the sole single-crystal silicon substrate 1, is not limited to 5×3, as shown in FIG. 31, but is determined by the design size of the vibration type gyrosensor device 10 and by the arraying pitch of the vibration type gyrosensor devices 10.

In the next step, the plural vibration type gyrosensor devices 10, formed on the single-crystal silicon substrate 1, are severed to form single devices. There is no fixed rule as to the size or techniques used in fractionation of the vibration type gyrosensor devices 10 from the single-crystal silicon substrate 1. The shape of the vibration type gyrosensor device 10 following the fractionation is arbitrary.

Figure 32:
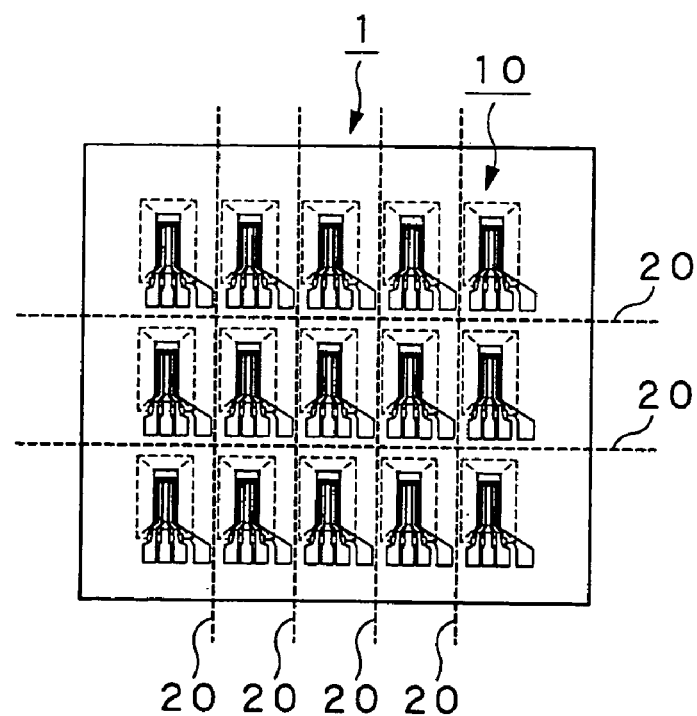
FIG. 32 is a plan view showing the state of a single crystal silicon substrate provided with slicing lines along which plural vibration type gyrosensors formed on the single crystal silicon substrate are to be sliced.

In the present embodiment, a fractionating mark is formed by a diamond cutter in the manner of profiling a device fractionating line 20, shown in FIG. 32. The single-crystal silicon substrate 1 was then broken manually along the fractionating mark to sever the vibration type gyrosensor devices 10 to take out the so severed devices. It is noted that various techniques may be used to fractionate the single-crystal silicon substrate 1. For example, grinding by a grinding stone or cutting exploiting the surface orientation of the single-crystal silicon substrate 1 may be used.

Figure 33:
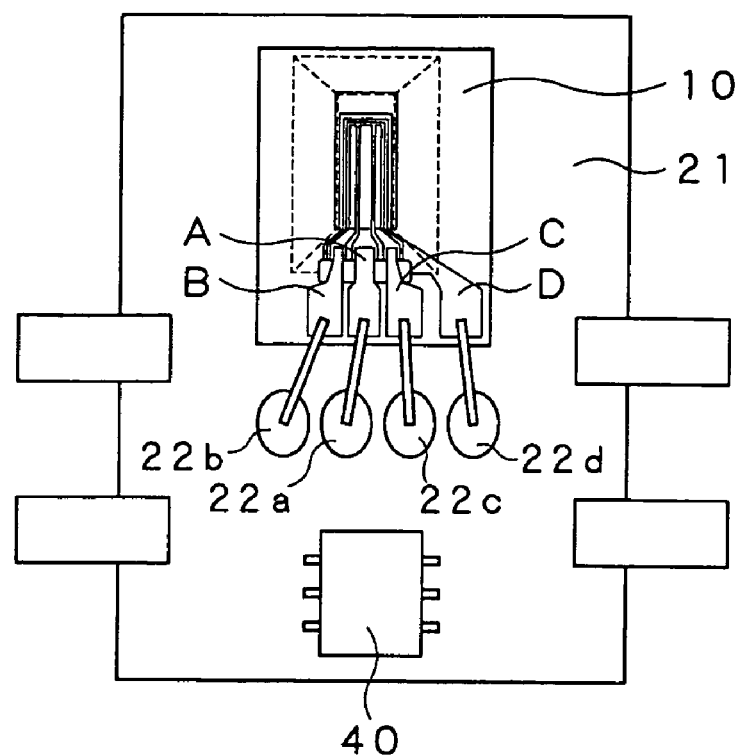
FIG. 33 is a plan view showing the state in which the vibration type gyrosensor has been affixed to an IC substrate.
Figure 34:
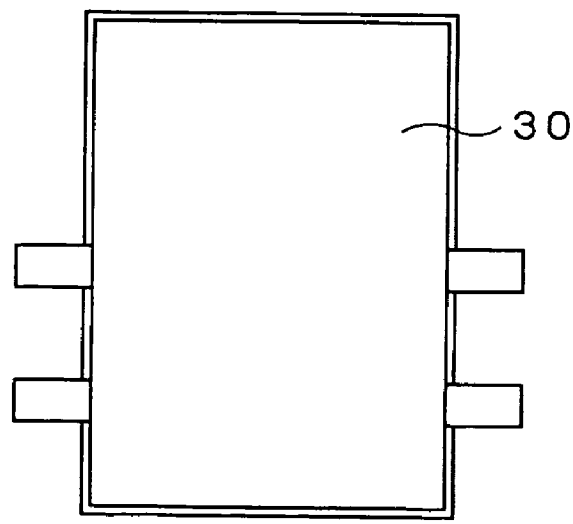
FIG. 34 is a plan view showing the state in which a cover material has been mounted to an angular velocity sensor provided with a vibration type gyrosensor.

The so severed vibration type gyrosensor device 10 was then bonded to an IC substrate 21, as shown in FIG. 33. Although the technique for bonding the vibration type gyrosensor device 10 to the IC substrate 21 is optional, an anaerobic adhesive was used for bonding in the present embodiment.

After bonding the vibration type gyrosensor device 10 to the IC substrate 21, electrical connection is established. The IC circuit 40, explained with reference to FIG. 2, is loaded on the IC substrate 21. On the IC substrate 21, there are also formed a substrate terminal 22a, connected to an end of the AGC 44, shown in FIG. 2, substrate terminals 22b, 22c, connected to the synchronous detection circuit 46, and a substrate terminal 22d, connected to a reference electrode, not shown.

In the present embodiment, the conductor interconnecting terminals A, B, C and D and the substrate terminals 22a, 22b, 22c and 22d in the IC substrate 21 were electrically interconnected, using a wiring method by wire bonding. The wiring method used is arbitrary, and a technique of forming electrically conductive bumps, as used for a single-crystal, may also be used.

The cover 30 is then mounted for protection, in order to eliminate contact with outside of the vibration type gyrosensor device 10 and the circuitry on the IC substrate 21. Although the material for the cover 30 is arbitrary, it is desirable to use a material, exhibiting a shield effect, such as SUS, in consideration of the effect of the external noise.

Additionally, the cover 30 is to be shaped so as no to obstruct vibrations of the oscillator 11. The above completes the angular velocity sensor 50.

When the oscillator 11 is resonated at a preset resonant frequency by applying the voltage to the driving electrode 6a of the oscillator 11, provided to the vibration type gyrosensor device 10, forming the angular velocity sensor 50, the oscillator 11 is resonated with the longitudinal resonance frequency along the longitudinal direction, corresponding to the direction of thickness of the oscillator 11, while being resonated with the transverse resonance frequency along the transverse direction, corresponding to the width-wise direction of the oscillator 11.

Meanwhile, the detection sensitivity of the angular velocity of the vibration type gyrosensor device 10, referred to below simply as the sensitivity, is increased in direct proportion to the amount of oscillations when the oscillator 11 is subjected to self-excited vibrations, signal level of a detection signal obtained from the detection electrodes 6b, 6c and to the detection efficiency. The performance of the vibration type gyrosensor device 10 may appreciably be increased by raising the sensitivity of the vibration type gyrosensor device 10.

For example, the amount of oscillations of the oscillator 11 may be increased by increasing the width of the driving electrode 6a for increasing the area of the driving electrode 6a. The signal level of the detection signal may be increased by adjusting the lengths of the detection electrodes 6b, 6c, such as to leave the root side of the oscillator 11 where the change of the piezoelectric layer 5a in case of application of the angular velocity to the oscillator 11 is maximum, for thereby increasing the average electrical charges per unit area of the detection electrode. In addition, the detection efficiency may be improved by appropriately determining the position of the detection electrodes 6b, 6c with respect to the oscillator 11.

In the above explanation, the width t13 of the driving electrode 6a, provided on the oscillator 11, the length t12 of the detection electrodes 6b, 6c and the position of the detection electrodes 6b, 6c on the oscillator 11, are fixed, as shown for example in FIG. 18. This, however, does not give the optimum sensitivity. Thus, in the following explanation, the width of the driving electrode 6a, the lengths of the detection electrodes 6b, 6c and the positions of the detection electrodes 6b, 6c on the oscillator 11 are changed, the corresponding values of the sensitivity are measured, and the proper width of the driving electrode 6a, the proper lengths of the detection electrodes 6b, 6c and the proper positions of the detection electrodes 6b, 6c on the oscillator 11, which will optimize the sensitivity of the vibration type gyrosensor device 10, are determined.

The step of forming the driving electrode 6a and the detection electrodes 6b, 6c from the electrode film 6 is the same as that explained above except changing the shape of the resist film pattern formed on the electrode film 6 at the time of ion etching and hence the corresponding explanation is omitted for simplicity.

(Driving Electrode Width)

First, the case in which the width of the driving electrode 6a has been changed is explained. Meanwhile, in the foregoing explanation, the width of the driving electrode 6a is t13 and those of the detection electrodes 6b, 6c is t14. In the following explanation, the width of the driving electrode 6a is W0 and those of the detection electrodes 6b, 6c are W1 and W2, respectively, by way of re-definition.

Figure 35:
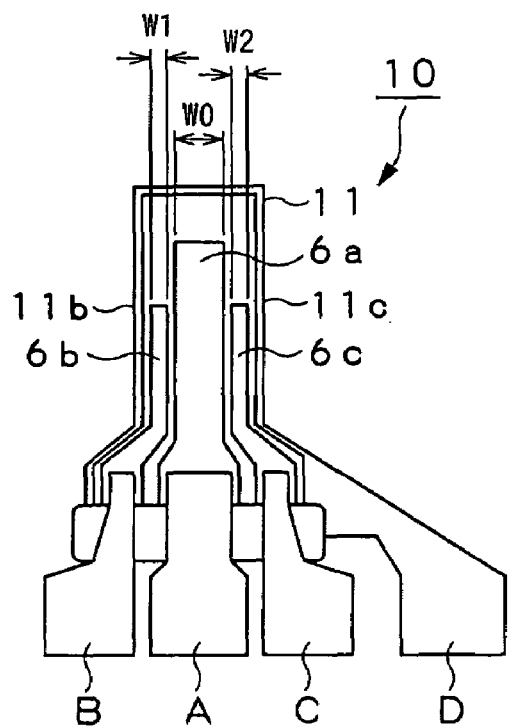
FIG. 35 illustrates the width of the driving electrode to be changed of the vibration type gyrosensor.
Figure 36:
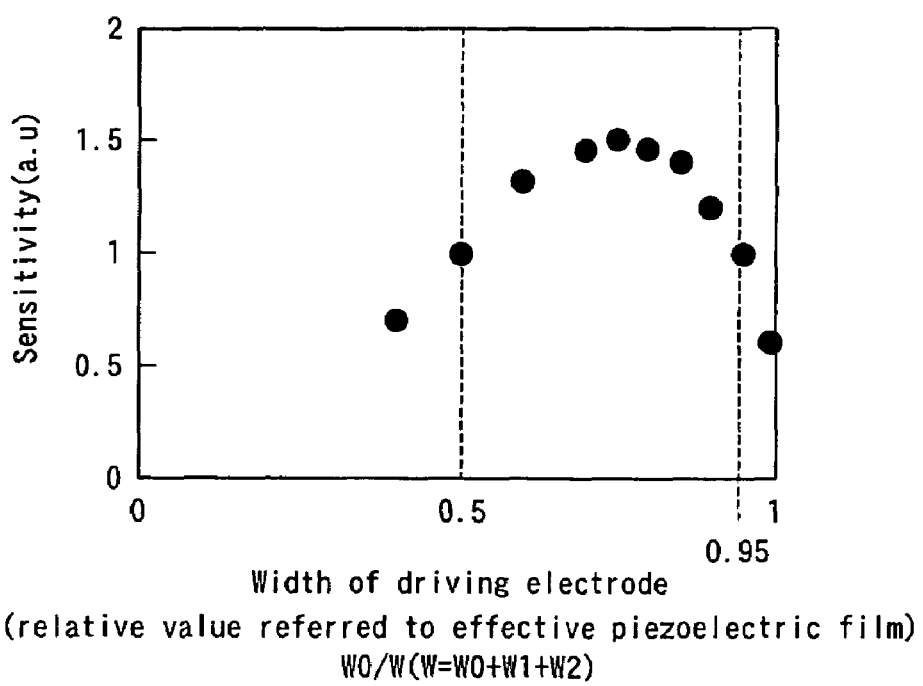
FIG. 36 shows the relation between the relative width and sensitivity of the driving electrode.

FIG. 35 shows the vibration type gyrosensor device 10 in case the width W0 of the driving electrode 6a is changed, and FIG. 36 shows measured results of the sensitivity of the vibration type gyrosensor device 10.

Meanwhile, as the width W0 of the driving electrode 6a is changed, the widths W1 and W2 of the detection electrodes 6b, 6c are also changed, as the following conditions are satisfied. There are two conditions to be met when the widths of the detection electrodes 6b, 6c are changed to W1 and W2, that is, that a separation between the detection electrodes 6b, 6c is to be maintained at a value which will enable optimum driving of the oscillator 11, and that the detection electrodes 6b, 6c are arranged at a sizeable distance from the sidewall surfaces 11b, 11c of the oscillator 11.

In FIG. 36, the driving electrode width, plotted on the abscissa, is expressed by the ratio of the width W0 of the driving electrode 6a to the effective width of the piezoelectric film W, as the sum total of the width W0 of the driving electrode 6a on the oscillator 11 and the widths W1 and W2 of the detection electrodes 6b, 6c on the oscillator 11 (W=W0+W1+W2) (W0/W1), that is, the relative value of the width W0 of the driving electrode 6a when the effective width of the piezoelectric film W is set to 1. Meanwhile, if, in the following explanation, the width W0 of the driving electrode 6a is expressed as a relative value, the same width is termed the relative width of the driving electrode 6a.

In FIG. 36, the sensitivity, plotted on the abscissa, and which is found as a product of the amount of oscillations of the oscillator 11 in case the oscillator is subjected to self-excited vibrations, and the detection signal as detected by the detection electrodes 6b, 6c, is represented as a relative value against the sensitivity which is obtained when the reference electrode is formed on the oscillator 11 and which is set to 1 (a.u). That is, when the sensitivity shown in FIG. 36 is not less than 1 (a.u), the sensitivity is higher than that of the vibration type gyrosensor device 10 having reference electrodes mounted on the oscillator 11.

The reference electrodes denote the driving electrode 6a, detection electrode 6b and the detection electrode 6c in case the width W0 of the driving electrode 6a and the widths W1 and W2 of the detection electrodes 6b, 6c are set so that W0:W1:W2=2:1:1, the separation between the driving electrode 6a and the detection electrodes 6b, 6c is infinitesimally close to zero and the mounting position of the detection electrodes 6b, 6c on the oscillator 11 is infinitesimally close to the sidewall sections 11b, 11c of the oscillator 11.

The lengths of the driving electrode 6a and the detection electrodes 6b, 6c are set to be the distances L1, L2 from the root line R of the oscillator 11 to the center-of-gravity positions of the respective electrode areas, respectively. In case the driving electrode 6a and the detection electrodes 6b, 6c are the reference electrodes, L1=L2.

Hence, if the driving electrode 6a and the detection electrodes 6b, 6c are the reference electrodes, and the width of the driving electrode 6a is represented by the aforementioned relative width, the relative width is 2/(2+1+1)=0.5, because Wo:W1:W2=2:1:1. The sensitivity at this time is 1 (a.u).

In case the relative width of the driving electrode 6a is increased from 0.5, the sensitivity is increased from 1 (a.u) to ca. 1.5 (a.u). The sensitivity is decreased with increase in the relative width of the driving electrode 6a, such that, when the relative width is 0.95, the sensitivity is again 1 (a.u). When the relative width of the driving electrode 6a is 1, the sensitivity is on the order of 0.6 (a.u). Thus, for a range of 0.5<relative width (W0/W)<0.95, the sensitivity of the vibration type gyrosensor device 10 is appreciably higher than the sensitivity 1.0 (a.u) in case the driving electrode 6a and the detection electrodes 6b, 6c are reference electrodes.

Meanwhile, the decrease in sensitivity for a range of 0.95<relative width of the driving electrode 6a (W0/W)<1 is ascribable to the IC circuit 40, in case the vibration type gyrosensor device 10 is connected to the IC circuit 40 to form the angular velocity sensor 50, as shown in FIG. 2. That is, for the relative width of the driving electrode 6a such that 0.95<relative width (W0/W)<1, the sensitivity of the vibration type gyrosensor device 10 is dependent on the electronic circuit. This may readily be improved by improving the IC circuit 40, such that the sensitivity on the order of 1 (a.u) or higher may be achieved, even for the range of 0.95<relative width (W0/W)<1.

Thus, in case the effect of the electronic circuit, such as IC circuit 40, actuating the vibration type gyrosensor device 10, is disregarded, the relative width of the driving electrode 6a, for which the sensitivity of the vibration type gyrosensor device 10, carrying the reference electrode on the oscillator 11, is 1 (a.u) or higher, is prescribed by 0.5<relative width (W0/W)<1, whereas, in case the effect of the electronic circuit is rigorously taken into account, it is prescribed by 0.5<relative width (W0/W)≦0.95. Thus, by determining the width W0 of the driving electrode 6a so as to give the above-defined relative width, it is possible to achieve the high sensitivity of the vibration type gyrosensor device 10.

(Length of the Detection Electrode)

Figure 38:
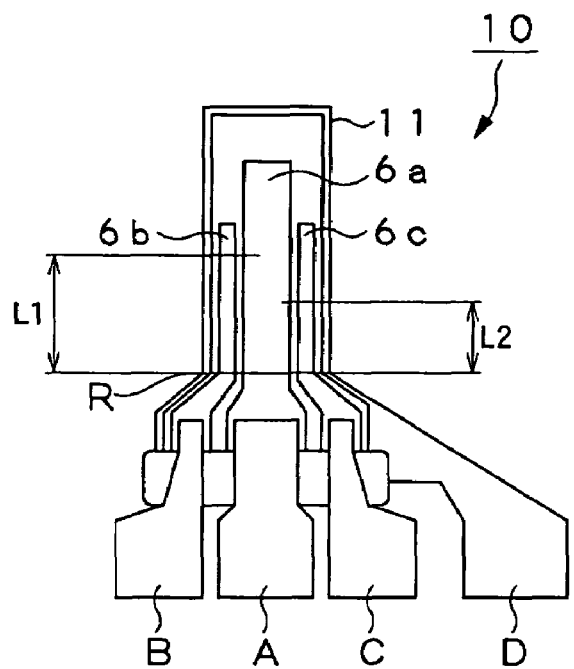
FIG. 38 illustrates the length of the detection electrode to be changed in the vibration type gyrosensor.

The case in which the length of the detection electrode 6a is changed is now explained. FIG. 38 shows the vibration type gyrosensor device 10 in case the lengths of the detection electrodes 6b, 6c are changed, and FIG. 39 shows the results of measurement of the sensitivity of this vibration type gyrosensor device 10.

Figure 39:
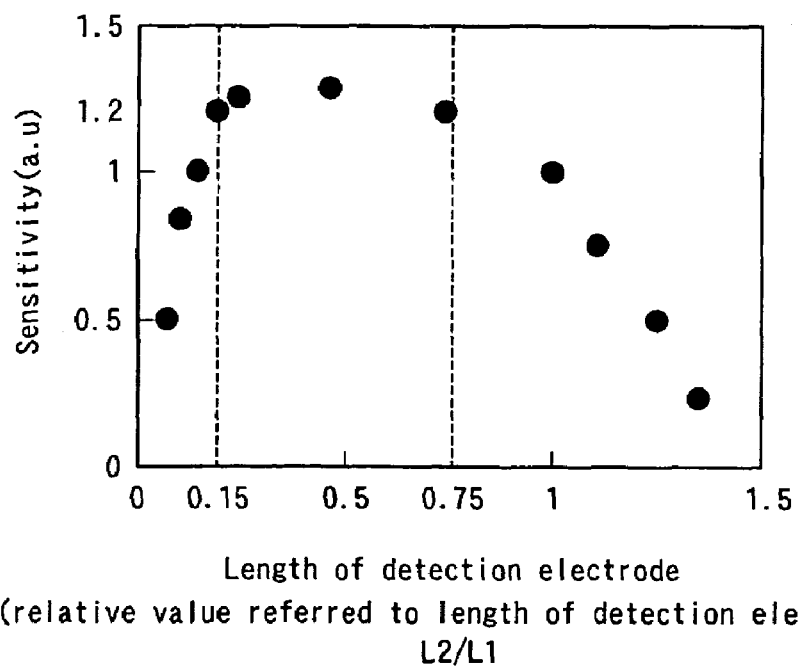
FIG. 39 shows the relation between the relative length of the detection electrode and sensitivity.

The length of the detection electrode, plotted on the abscissa of FIG. 39, is given as the ratio of a distance L2 to a distance L1, where L1 is a distance from the root line R of the oscillator 11 to the center-of-gravity position of the driving electrode 6a and L2 is a distance from the root line R of the oscillator 11 to the center-of-gravity position of the detection electrodes 6b, 6c, as shown in FIG. 38.

That is, the length of the detection electrode on the abscissa of FIG. 39 is given as a relative value of the distance L2 from the root line R of the oscillator 11 to the center-of-gravity position of the detection electrodes 6b, 6c, as referred to the distance from the root line R of the oscillator 11 to the center-of-gravity position of the driving electrode 6a, which distance is set to 1. In the following explanation, the length of the detection electrodes 6b, 6c, expressed as the relative value, is termed the relative lengths of the detection electrodes 6b, 6c.

On the other hand, the sensitivity on the ordinate of FIG. 39 is the sensitivity as found by a product of the amount of oscillations of the oscillator 11 in case the oscillator performs self-excited oscillations, and the detection signal obtained from the detection electrodes 6b, 6c, with the sensitivity being expressed as a relative value, referred to the sensitivity of the oscillator 11, carrying the reference electrode 11, as set to 1 (a.u). Meanwhile, the reference electrode has already been explained with reference to FIG. 37 and hence is not explained here in order to avoid redundancy.

Meanwhile, if the length of the detection electrodes 6b, 6c, in case the lengths of the detection electrodes 6b, 6c, which are the reference electrodes, is expressed by the aforementioned relative length, L1=L2, and hence L2/L1=1. The sensitivity for this case is 1 (a.u).

On the other hand, the length of the detection electrodes 6b, 6c is prescribed, according to the present invention, in such a manner that the sensitivity in case the reference electrodes are formed on the oscillator 11 will be improved by 20%. Thus, if the sensitivity of the vibration type gyrosensor device 10 is to be 1.2 (a.u) or higher, which is improved by 20% as compared to the sensitivity of 1 (a.u) in the reference electrode, as shown in FIG. 39, it is sufficient that the relative length of the detection electrodes 6b, 6c is prescribed to a range of 0.15<relative length (L2/L1)≦0.75.

Meanwhile, the decrease in sensitivity for the relative length of the detection electrodes 6b, 6c in a range of 0<relative length (L2/L1)<0.15 is ascribable to the effect of the IC circuit 40 in case the vibration type gyrosensor device 10 is connected to the IC circuit 40 as shown in FIG. 2 to form the angular velocity sensor 50. Thus, for the range of the relative length of the detection electrodes 6b, 6c such that 0<relative length (L2/L1)<0.15, the sensitivity of the vibration type gyrosensor device 10 is dependent on the electronic circuit. This may readily be improved by improving the IC circuit 40, such that the sensitivity on the order of 1.2 (a.u) or higher may be achieved, even for the range of 0<relative length (L2/L1)<0.15.

Thus, in case the effect of the electronic circuit, such as IC circuit 40, actuating the vibration type gyrosensor device 10, is disregarded, the relative length of the detection electrodes 6b, 6c, for which the sensitivity of the vibration type gyrosensor device 10, carrying the reference electrode on the oscillator 11, is 1.2 (a.u) or higher, is prescribed by 0<relative length (L2/L1)≦0.75, whereas, in case the effect of the electronic circuit is rigorously taken into account, it is prescribed by 0.15<relative width (L2/L1)≦0.75. Thus, by determining the length L2 from the root line R of the oscillator 11 to the center-of-gravity of the detection electrodes 6b, 6c so as to give the above relative length, it is possible to achieve the high sensitivity of the vibration type gyrosensor device 10.

(Position of Detection Electrode)

The case in which the position of the detection electrodes 6b, 6c on the oscillator 11 is changed is now explained. In the foregoing explanation, the width of the oscillator 11 is set to t6. However, in the following, the width S of the oscillator 11 is redefined as S.

Figure 40:
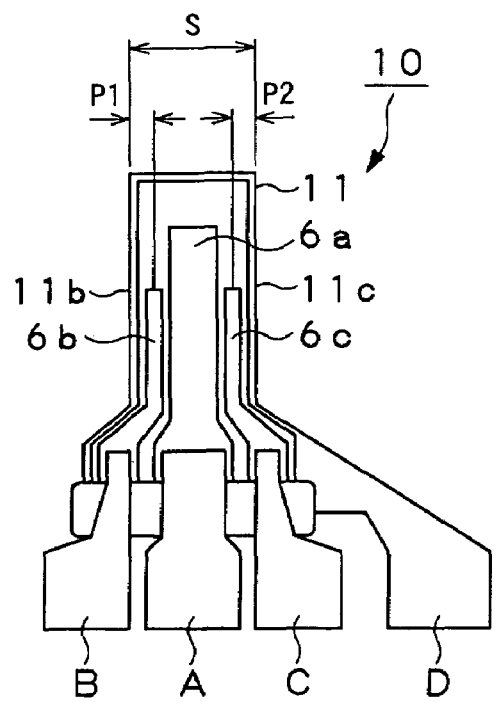
FIG. 40 illustrates the vibration type gyrosensor the position of the detection electrode position of which is to be changed.
Figure 41:
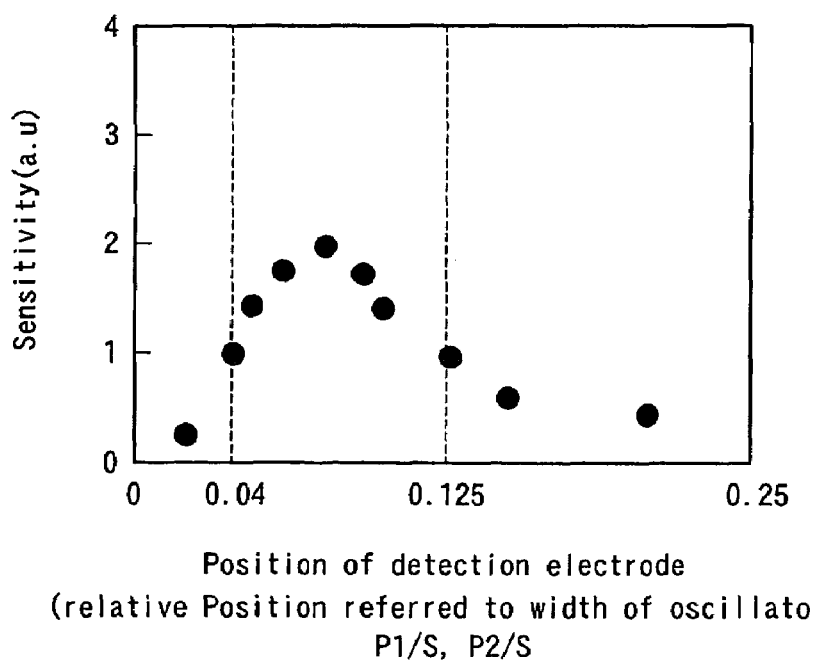
FIG. 41 illustrates the relation between the relative position of the detection electrode and sensitivity.

FIG. 40 shows the vibration type gyrosensor device 10, the positions of the detection electrodes 6b, 6c of which on the oscillator 11 have been changed. FIG. 41 shows measured results of sensitivity of the vibration type gyrosensor device 10.

The position of the detection electrode 6b, as plotted on the abscissa of FIG. 41, is shown as a ratio of the shortest distance P1 from the sidewall surface 11b of the oscillator 11 to the width-wise center of the detection electrode 6b to the width S of the oscillator 11 (P1/S) in FIG. 40. The position of the detection electrode 6c, as plotted on the abscissa of FIG. 41, is shown as a ratio of the shortest distance P2 from the sidewall surface 11c of the oscillator 11 to the width-wise center of the detection electrode 6c to the width S of the oscillator 11 (P2/S) in FIG. 40.

In short, the detection electrode positions on the abscissa of FIG. 41 are indicated as relative values of the distances P1, P2 from the sidewall surfaces 11b, 11c of the oscillator 11 to the width-wise center positions of the detection electrodes 6b, 6c when the width S of the oscillator 11 is set to 1. It is noted that, in the following explanation, the positions of the detection electrodes 6b, 6c, represented as the relative values, are termed the relative positions of the detection electrodes 6b, 6c.

Meanwhile, the sensitivity, plotted on the abscissa in FIG. 41, and which is found as a product of the amount of oscillations of the oscillator 11 in case the oscillator is subjected to self-excited vibrations, and the detection signal as detected by the detection electrodes 6b, 6c, is represented as a relative value against the sensitivity which is obtained when the reference electrode is formed on the oscillator 11 and which is set to 1 (a.u). The reference electrode has already been explained with reference to FIG. 37 and hence is not explained here for simplicity.

Figure 37:
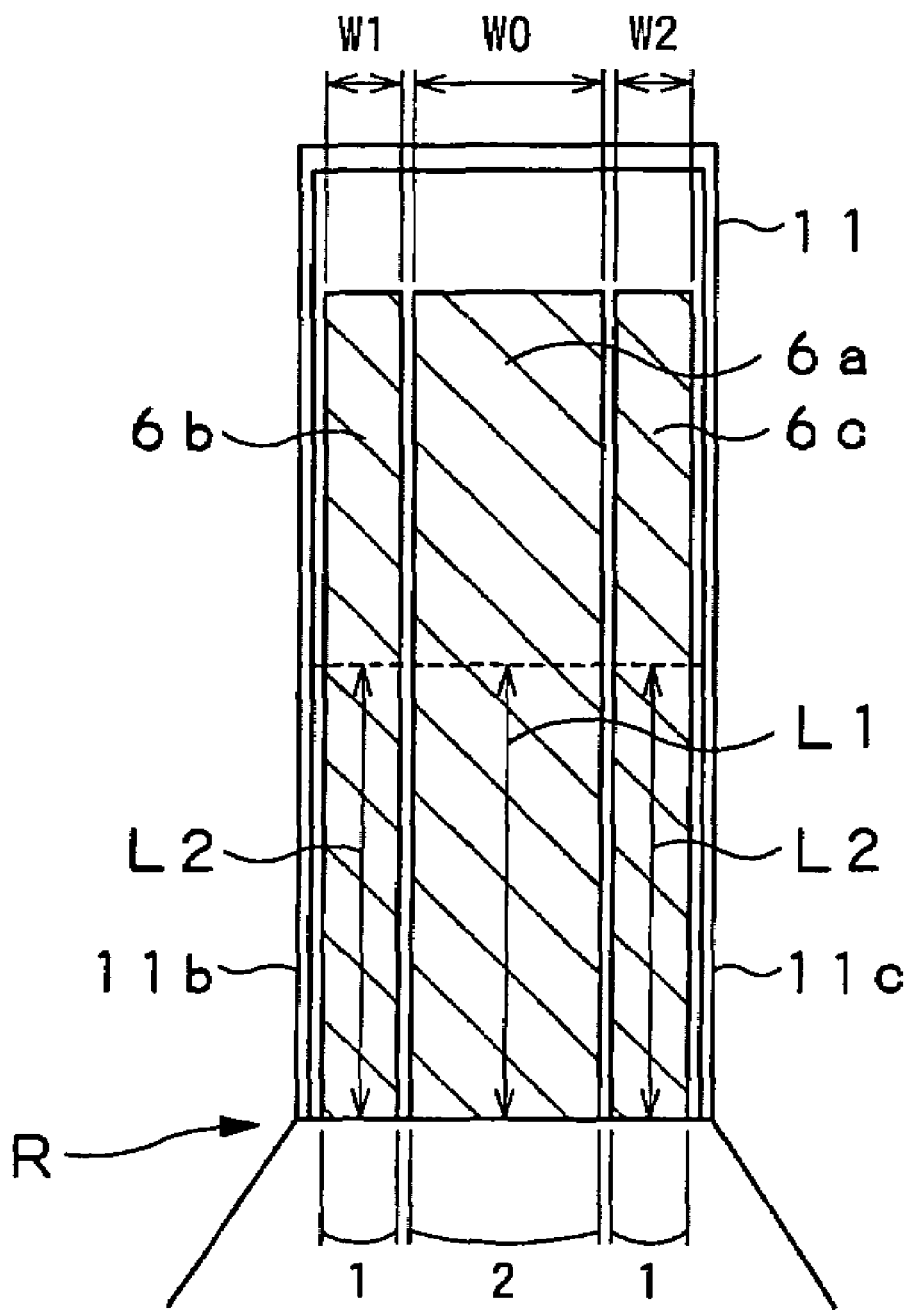
FIG. 37 illustrates a reference electrode.

It should be noted that, in case the driving electrode 6a and the detection electrodes 6b, 6c are reference electrodes, the separations between the adjoining electrodes are infinitesimally close to 0 and the detection electrodes 6b, 6c are arranged so as to be infinitesimally close to the sidewall surfaces 11b, 11c of the oscillator 11. Thus, in case the positions of the detection electrodes 6b, 6c are represented by the aforementioned relative positions, the shortest distances P1, P2 from the sidewall surfaces 11b, 11c of the oscillator 11 to the width-wise center positions of the detection electrodes 6b, 6c are each equal to 0.125, as shown in FIG. 37. The sensitivity for this case is 1 (a.u).

If the relative positions of the detection electrodes 6b, 6c are changed from 0.125 in the minus direction, that is, in a direction towards the sidewall surfaces 11b, 11c of the oscillator 11, the sensitivity increases from 1 (a.u) to ca. 2(a.u). The sensitivity decreases with changes in the relative positions of the detection electrodes 6b, 6c, until it is again equal to 1 (a.u), and falls below 1 (a.u) with further change in the relative position.

Thus, in the ranges of 0.04≦relative position (P1/S) <0.125 and 0.04≦relative position (P2/S)<0.125, the sensitivity of the vibration type gyrosensor device 10 appreciably surpasses the sensitivity of 1.0 (a.u) which prevails in case the driving electrode 6a and the detection electrodes 6b, 6c are reference electrodes.

Referring to FIG. 41, the lowering in the sensitivity for the ranges of the relative positions of the detection electrodes 6b, 6c such that 0<relative positions (P1/S)<0.04 and 0<relative positions (P2/S)<0.04, is ascribable to the IC circuit 40 for the case where the vibration type gyrosensor device is connected to the IC circuit 40 to constitute the angular velocity sensor 50, as shown in FIG. 2.

Thus, for the ranges of the relative lengths of the detection electrodes 6b, 6c, such that 0<relative position (P1/S)<0.04 and 0<relative position (P2/S)<0.04, the sensitivity of the vibration type gyrosensor device 10 depends on the electronic circuit. This inconvenience may be alleviated by improving the IC circuit 40, such that the sensitivity not lower than 1 (a.u) may be achieved for the ranges of 0<relative position (P1/S)<0.04 and 0<relative position (P2/S)<0.04.

Thus, in case the effect of the electronic circuit, such as IC circuit 40, actuating the vibration type gyrosensor device 10, is disregarded, the relative lengths of the detection electrodes 6b, 6c, for which the sensitivity of the vibration type gyrosensor device 10, carrying the reference electrodes on the oscillator 11, is 1 (a.u) or higher, is prescribed by 0<relative position (P1/S)<0.125 and by 0<relative position (P2/S)<0.125, whereas, in case the effect of the electronic circuit is rigorously taken into account, it is prescribed by 0.04<relative position (P1/S)<0.125 and by 0.04<relative position (P2/S)<0.125. Thus, by determining the positions of the detection electrodes 6b, 6c so as to give the above-defined relative positions, it is possible to achieve the high sensitivity of the vibration type gyrosensor device 10.

Thus, by prescribing the width of the driving electrode 6a, the lengths and the positions of the detection electrodes 6b, 6c, the vibration type gyrosensor device 10 may be appreciably improved in sensitivity as compared to the case in which the reference electrode is formed on the oscillator.

Although the width of the driving electrode 6a, the lengths and the positions of the detection electrodes 6b, 6c are separately prescribed, in the foregoing explanation, this is merely for the sake of explanation and it is naturally possible to form the driving electrode 6a and the detection electrodes 6b, 6c on the oscillator 11, by optionally combining the aforementioned conditions, thereby improving the sensitivity.

In the foregoing explanation, the driving electrode 6a and the detection electrodes 6b, 6c are all rectangular in shape. The present invention is not limited to this particular profile of the electrodes, such that the driving electrode 6a and the detection electrodes 6b, 6c may be trapezoidally-shaped, as shown for example in FIG. 42.

Figure 42:
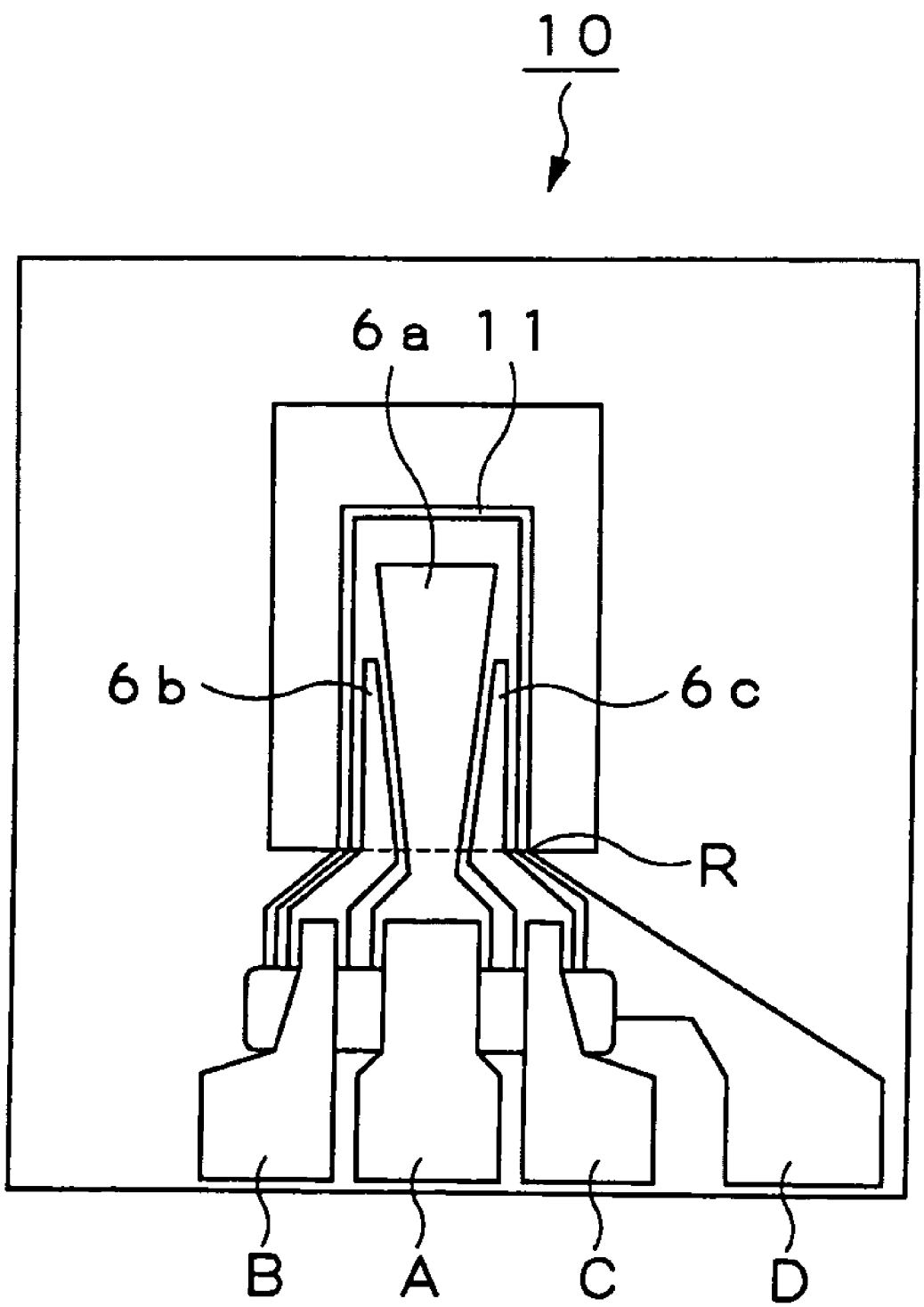
FIG. 42 shows an exemplary case of the shape of a driving electrode and detection electrodes other than a rectangular shape.

With the trapezoidally-shaped driving electrode 6a, as shown in FIG. 42, the electrode area is increased, with the consequence that the vibration type gyrosensor device 10 may be improved in sensitivity. Moreover, the trapezoidal shape of the detection electrodes 6b, 6c may be flared towards the root line R, as shown in FIG. 42. This increases the area of the detection electrodes 6b, 6c towards the root line R of the oscillator 11 where the angular velocity applied undergoes maximum variations to increase the level of the detection signal of the detection electrodes 6b, 6c, with the consequence that the vibration type gyrosensor device 10 may be improved further in sensitivity.

By setting the shape of the driving electrode 6a and the detection electrodes 6b, 6c to the trapezoidal shape, and by prescribing the width of the driving electrode 6a, and the length as well as the positions of the detection electrodes 6b, 6c, the vibration type gyrosensor device 10 may be improved further in sensitivity under synergistic effects.

In the above-described embodiment, the vibration type gyrosensor device 10, formed by the above technique, has been shown only by way of example, and the width of the driving electrode 6a, as well as the length of the detection electrodes 6b, 6c and the positions thereof on the oscillator 11, has also been prescribed. The present invention is, however, not limited to the configuration and may broadly be applied to a vibration type gyrosensor device having a cantilevered oscillator including a lower electrode, a piezoelectric film and an upper electrode, formed by a thin film forming technique on a single-crystal silicon substrate, with the gyrosensor device detecting the angular velocity by exploiting the piezoelectric effect of the piezoelectric film.

What is claimed is:

1. A vibration type gyrosensor device including:
    a cantilevered oscillator having a lower electrode, a piezoelectric film and an upper electrode formed by a thin film forming process on a single-crystal silicon substrate, for detecting the angular velocity by exploiting the piezoelectric effect of said piezoelectric film, wherein,
    said upper electrode comprises a driving electrode arranged along the length of said oscillator for applying the voltage for causing oscillations of said oscillator, and first and second detection electrodes arranged on both sides of and parallel to said driving electrode and extending along the length of said oscillator without contacting said driving electrode, and
    given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: $0<(L2/L1)\leq 0.75(1)$ exists.

2. The vibration type gyrosensor device according to claim 1, wherein the following relationship: $0.15\leq (L2/L1)<0.75(2)$ exists.

3. The vibration type gyro sensor device according to claim 1, wherein given a shortest distance P1 from the sidewall surface of said oscillator to the width-wise center position of said first detection electrode, a shortest distance P2 from the sidewall surface of said oscillator to the width-wise center position of said second detection electrode, and with a width S of said oscillator, the following relationships $0<(P1/S)<0.125(3)$ and $0<(P2/S)<0.125(4)$ exist.

4. The vibration type gyrosensor device according to claim 3, wherein the following relationships: $0.04\leq P1/S)<0.125(5)$ and $0.04\leq P2/S)<0.125(6)$ exist.

5. The vibration type gyrosensor device according to claim 1, wherein given a width W0 of said driving electrode, a width W1 of said first detection electrode, a width W2 of said second detection electrode, and with $W=W0+W1+W2$, the following relationship: $0.5<(W0/W)<1(7)$ exists.

6. The vibration type gyrosensor device according to claim 5, wherein the following relationship: $0.5<(W0/W)\leq 0.95(8)$ exists.

7. A vibration type gyrosensor device including:
a cantilevered oscillator having a lower electrode, a piezoelectric film and an upper electrode, and configured for detecting the angular velocity by exploiting the piezoelectric effect of said piezoelectric film, wherein,
a first protective film pattern including a first opening in one major surface of a single-crystal silicon substrate having surface orientation {100} of said one major surface and surface orientation {100} of an opposite side major surface, said first opening being formed by straight lines parallel or perpendicular to a {110} plane, said first opening being subjected to crystal anisotropic etching until the thickness of said oscillator is reached; said lower electrode, said piezoelectric film and the upper electrode are sequentially deposited in an area of said opposite side major surface, on the opposite side of said one major surface, subjected to crystal anisotropic etching to give a thickness of said oscillator, said area being an area for said oscillator,
a second protective film pattern, having a second opening, on said opposite side major surface, carrying said lower electrode, said piezoelectric film and the upper electrode, said second opening being formed by straight lines parallel or perpendicular to said {110} plane, and being profiled to form a gap to provide the cantilevered shape of the oscillator, said second opening being subjected to reactive ion etching (RIE) to form said oscillator, and
said upper electrode comprises a driving electrode, arranged along the length of said oscillator for applying the voltage for causing oscillations of said oscillator, and first and second detection electrodes, arranged on both sides of and parallel to said driving electrode, for extending along the length of said oscillator, without contacting said driving electrode; and
given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: $0<(L2/L1)\leq 0.75(1)$ exists; said symbol { } being used for collective appellation of surface orientation different in directions.

8. The vibration type gyrosensor device according to claim 7, wherein the following relationship: $0.15\leq (L2/L1)\leq 0.75(2)$ exists.

9. The vibration type gyrosensor device according to claim 7, wherein given a shortest distance P1 from the sidewall surface of said oscillator to the width-wise center position of said first detection electrode, a shortest distance P2 from the sidewall surface of said oscillator to the width-wise center position of said second detection electrode, and with a width S of said oscillator, the following relationships: $0<(P1/S)<0.125(3)$ and $0<(P2/S)<0.125(4)$ exist.

10. The vibration type gyrosensor device according to claim 9, wherein the following relationships: $0.04\leq P1/S)<0.125(5)$ and $0.04\leq P2/S)<0.125(6)$ exist.

11. The vibration type gyro sensor device according to claim 7, wherein given a width W0 of said driving electrode, a width W1 of said first detection electrode, a width W2 of said second detection electrode, and with $W=W0+W1+W2$, the following relationship: $0.5<(W0/W)<1(7)$ exists.

12. The vibration type gyrosensor device according to claim 11, wherein the following relationship: $0.5<(W0/W)\leq 0.95(8)$ exists.

13. A vibration type gyrosensor device including:
a cantilevered oscillator having a lower electrode, a piezoelectric film and an upper electrode, and configured for detecting the angular velocity by exploiting the piezoelectric effect of said piezoelectric film, wherein,
said upper electrode comprises a driving electrode, arranged along the length of said oscillator for applying the voltage for causing oscillations of said oscillator, and first and second detection electrodes, arranged on both sides of and parallel to said driving electrode, for extending along the length of said oscillator, without contacting said driving electrode, and
given a shortest distance P1 from the sidewall surface of said oscillator to the width-wise center position of said first detection electrode, a shortest distance P2 from the sidewall surface of said oscillator to the width-wise center position of said second detection electrode, and with a width S of said oscillator, the following relationships: $0<(P1/S)<0.125(1)$ and $0<(P2/S)<0.125(2)$ exist.

14. The vibration type gyrosensor device according to claim 13, wherein the following relationships $0.04\leq (P1/S)<0.75(3)$ and $0.04\leq (P2/S)<0.75(1)$ exist.

15. The vibration type gyrosensor device according to claim 13, wherein given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: $0.15\leq (L2/L1)\leq 0.75(2)$ exists.

16. The vibration type gyrosensor device according to claim 13, wherein given a width W0 of said driving electrode, a width W1 of said first detection electrode, a width W2 of said second detection electrode, and with $W=W0+W1+W2$, the following relationship: $0.5<(W0/W)<1(6)$ exists.

17. The vibration type gyrosensor device according to claim 7, wherein the following relationship: $0.5<(W0/W)\leq 0.95(7)$ exists.

18. A vibration type gyrosensor device including:
a cantilevered oscillator having a lower electrode, a piezoelectric film and an upper electrode, and configured for detecting the angular velocity by exploiting the piezoelectric effect of said piezoelectric film,
wherein,
a first protective film pattern including a first opening in one major surface of a single-crystal silicon substrate having surface orientation {100} of said one major surface and surface orientation {100} of an opposite side major surface, said first opening being formed by straight lines parallel or perpendicular to a {110} plane, said first opening being subjected to crystal anisotropic etching until the thickness of said oscillator is reached,
said lower electrode, said piezoelectric film and the upper electrode are sequentially deposited in an area of said opposite side major surface, on the opposite side of said one major surface, subjected to crystal anisotropic etching to give a thickness of said oscillator, said area being an area for said oscillator
a second protective film pattern, having a second opening, on said opposite side major surface, carrying said lower electrode, said piezoelectric film and the upper electrode, said second opening being formed by straight lines parallel or perpendicular to said {110} plane, and being profiled to form a gap to provide the cantilevered shape of the oscillator, said second opening being subjected to reactive ion etching (RIE) to form said oscillator and
said upper electrode comprises a driving electrode, arranged along the length of said oscillator for applying the voltage for causing oscillations of said oscillator, and first and second detection electrodes arranged on both sides of and parallel to said driving electrode and extending along the length of said oscillator, without contacting said driving electrode, and
given a shortest distance P1 from the sidewall surface of said oscillator, provided with said first detection electrode a shortest distance P2 from the sidewall surface of said oscillator to the width-wise center position of said second detection electrode, and with a width S of said oscillator, the following relationships: $0<(P1/S)<0.125$ (1) and $0<(P2/S)<0.125$ (2) exist; said symbol { } being used for collective appellation of surface orientation different in directions.

19. The vibration type gyrosensor device according to claim 18, wherein the following relationships: $0.04 \leq (P1/S) <0.125$ (3) and $0.04 \leq (P2/S)<0.125$ (4) exist.

20. The vibration type gyrosensor device according to claim 18, wherein given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: $0.15 \leq (L2/L1) \leq 0.75$ (5) exists.

21. The vibration type gyrosensor device according to claim 18, wherein given a width W0 of said driving electrode, a width W1 of said first detection electrode, a width W2 of said second detection electrode, and with $W=W0+W1+W2$, the following relationship: $0.5<(W0/W)<1$ (6) exists.

22. The vibration type gyrosensor device according to claim 21, wherein the following relationship: $0.5<(W0/W) \leq 0.95$ (7) exists.

23. A vibration type gyrosensor device including:
a cantilevered oscillator having a lower electrode, a piezoelectric film and an upper electrode formed by a thin film forming process on a single-crystal silicon substrate, for detecting the angular velocity by exploiting the piezoelectric effect of said piezoelectric film,
wherein,
said upper electrode comprises a driving electrode, arranged along the length of said oscillator for applying the voltage for causing oscillations of said oscillator, and first and second detection electrodes, arranged on both sides of and parallel to said driving electrode, for extending along the length of said oscillator, without contacting said driving electrode and
given a width W0 of said driving electrode, a width W1 of said first detection electrode, a width W2 of said second detection electrode, and with $W=W0+W1+W2$, the following relationship: $0.5<(W0/W)<1$ (1) exists.

24. The vibration type gyrosensor device according to claim 23 wherein the following relationship: $0.5<(W0/W) \leq 0.95$ (2) exists.

25. The vibration type gyrosensor device according to claim 23, wherein given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: $0.15<(L2/L1) \leq 0.75$ (3) exists.

26. The vibration type gyrosensor device according to claim 23, wherein given a shortest distance P1 from the sidewall surface of said oscillator to the width-wise center position of said first detection electrode, a shortest distance P2 from the sidewall surface of said oscillator to the width-wise center position of said second detection electrode, and given a width S of said oscillator, the following relationships: $0.04 \leq (P1/S)<0.125$ (4) and $0.04 \leq (P2/S)<0.125$ (5) exist.

27. A vibration type gyrosensor device including:
a cantilevered oscillator having a lower electrode, a piezoelectric film and an upper electrode, and configured for detecting the angular velocity by exploiting the piezoelectric effect of said piezo electric film,
wherein,
a first protective film pattern including a first opening in one major surface of a single-crystal silicon substrate having surface orientation {100} of said one major surface and surface orientation {100} of an opposite side major surface, said first opening being formed by straight lines parallel or perpendicular to a {110} plane, said first opening being subjected to crystal anisotropic etching until the thickness of said oscillator is reached,
said lower electrode, said piezoelectric film and the upper electrode are sequentially deposited in an area of said opposite side major surface, on the opposite side of said one major surface, subjected to crystal anisotropic etching to give a thickness of said oscillator, said area being an area for said oscillator,
a second protective film pattern, having a second opening, on said opposite side major surface, carrying said lower electrode, said piezoelectric film and the upper electrode, said second opening being formed by straight lines parallel or perpendicular to said {110} plane, and being profiled to form a gap to provide the cantilevered shape of the oscillator, said second opening being subjected to reactive ion etching (RIE) to form said oscillator, said upper electrode comprises a driving electrode, arranged along the length of said oscillator for applying the voltage for causing oscillations of said oscillator, and-first and second detection electrodes, arranged on both sides of and parallel to said driving electrode, for extending along the length of said oscillator, without contacting said driving electrode, and given a width W0 of said driving electrode, a width W1 of said first detection electrode, a width W2 of said second detection electrode, and with W=W0+W1+W2, the following relationship: 0.5<(W0/W)<1(1) exists.

28. The vibration type gyrosensor device according to claim 27, wherein the following relationship: 0.15(W0/W)≦0.95(2) exists.

29. The vibration type gyrosensor device according to claim 27, wherein given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, the following relationship: 0.15<(L2/L1)≦0.75(3) exists.

30. The vibration type gyrosensor device according to claim 27, wherein given a shortest distance P1 from the sidewall surface of said oscillator to the width-wise center position of said first detection electrode, a shortest distance P2 from the sidewall surface of said oscillator, to the width-wise center position of said second detection electrode, and with a width S of said oscillator, the following relationships 0.04≦(P1/S)<0.125(4) and 0.04≦(P2/S)<0.125(5) exist.

31. A vibration type gyrosensor device including:
a cantilevered oscillator having a lower electrode, a piezoelectric film and an upper electrode formed by a thin film forming process on a single-crystal silicon substrate, for detecting the angular velocity by exploiting the piezoelectric effect of said piezoelectric film,
wherein,
said upper electrode comprises a driving electrode, arranged along the length of said oscillator for applying the voltage for causing oscillations of said oscillator, and first and second detection electrodes, arranged on both sides of and parallel to said driving electrode, for extending along the length of said oscillator, without contacting said driving electrode and
given a width W0 of said driving electrode, a width W1 of said first detection electrode, a width W2 of said second detection electrode, and with W=W0+W1+W2, given a distance L1 from the root of the oscillator to the center-of-gravity position of said driving electrode, a distance L2 from each of the root of the oscillator to the center-of-gravity position of said first detection electrode and from the root of the oscillator to the center-of-gravity position of said second detection electrode, and with a shortest distance P1 from the sidewall surface of said oscillator to the width-wise center position of said first detection electrode, a shortest distance P2 from the sidewall surface of said oscillator to the width-wise center position of said second detection electrode, and given a width S of said oscillator, the following relationships 0.04≦(P1/S)<0.125(4) and 0.04(P2/S)<0.125(5) exist.

32. The vibration type gyrosensor device according to claim 31, wherein the following relationship: 0.15≦(L2/L1)≦0.75(5) exists.

33. The vibration type gyrosensor device according to claim 31, wherein the following relationships: 0.04≦(P1/S)<0.125(6) and 0.04≦(P2/S)<0.125(7) exist.

34. The vibration type gyrosensor device according to claim 31, wherein the following relationship: 0.5<(W0/W)≦0.95(8) exists.

35. A vibration type gyrosensor device including:
a cantilevered oscillator having a lower electrode, a piezoelectric film and an upper electrode, and configured for detecting the angular velocity by exploiting the piezoelectric effect of said piezoelectric film,
wherein,
a first protective film pattern including a first opening in one major surface of a single-crystal silicon substrate having surface orientation {100} of said one major surface and surface orientation {100} of an opposite side major surface, said first opening being formed by straight lines parallel or perpendicular to a {110} plane, said first opening being subjected to crystal anisotropic etching until the thickness of said oscillator is reached; said lower electrode, said piezoelectric film and the upper electrode are sequentially deposited in an area of said opposite side major surface, on the opposite side of said one major surface, subjected to crystal anisotropic etching to give a thickness of said oscillator, said area being an area for said oscillator; a second protective film pattern, having a second opening, on said opposite side major surface, carrying said lower electrode, said piezoelectric film and the upper electrode, said second opening being formed by straight lines parallel or perpendicular to said {110} plane, and being profiled to form a gap to provide the cantilevered shape of the oscillator, said second opening being subjected to reactive ion etching (RIE) to form said oscillator;
said upper electrode comprises a driving electrode, arranged along the length of said oscillator for applying the voltage for causing oscillations of said oscillator, and-first and second detection electrodes, arranged on both sides of and parallel to said driving electrode, for extending along the length of said oscillator, without contacting said driving electrode, and
given a width W0 of said driving electrode, a width W1 of said first detection electrode, a width W2 of said second detection electrode, and with W=W0+W1+W2, given a distance L1 from the root of the oscillator to the center-of-gravity position of said driving electrode, a distance L2 from each of the root of the oscillator to the center-of-gravity position of said first detection electrode and the root of the oscillator to the center-of-gravity position of said second detection electrode, and with a shortest distance P1 from the sidewall surface of said oscillator to the width-wise center position of said first detection electrode, a shortest distance P2 from the sidewall surface of said oscillator to the width-wise center position of said second detection electrode, and given a width S of said oscillator, the following relationships: 0<(L2/L1)≦0.75(1); 0<(P1/S)<0.125(2); 0<(P2/S)<0.125(3); and 0.5<(W0/W)<1(4) exist.

36. The vibration type gyrosensor device according to claim 35, wherein the following relationship: 0.15≦(L2/L1)≦0.75(5) exists.

37. The vibration type gyrosensor device according to claim 35, wherein the following relationships: 0.04≦(P1/S)<0.125(6) and 0.04≦(P2/S)<0.125(7) exist.

38. The vibration type gyrosensor device according to claim 35, wherein the following relationship: 0.5<(W0/W)≦0.95(8) exists.

* * * * *